United States Patent
Gupta et al.

(10) Patent No.: US 9,418,331 B2
(45) Date of Patent: Aug. 16, 2016

(54) METHODS AND APPARATUS FOR TAGGING CLASSES USING SUPERVISED LEARNING

(71) Applicant: QUALCOMM Incorporated, San Diego, CA (US)

(72) Inventors: Vikram Gupta, San Diego, CA (US); Regan Blythe Towal, San Diego, CA (US); Victor Hokkiu Chan, Del Mar, CA (US); Ravindra Manohar Patwardhan, San Diego, CA (US); Jeffrey Levin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 243 days.

(21) Appl. No.: 14/065,089

(22) Filed: Oct. 28, 2013

(65) Prior Publication Data

US 2015/0120626 A1    Apr. 30, 2015

(51) Int. Cl.
*G06N 3/08* (2006.01)
*G06N 3/04* (2006.01)

(52) U.S. Cl.
CPC .............. *G06N 3/049* (2013.01); *G06N 3/0454* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 7,716,150 B2 | 5/2010 | Cheng et al. | |
| 2009/0319456 A1 | 12/2009 | Consul et al. | |
| 2010/0150448 A1 | 6/2010 | Lecerf et al. | |
| 2010/0299328 A1 | 11/2010 | Pachet | |
| 2011/0131279 A1 | 6/2011 | Karnik | |
| 2011/0161268 A1* | 6/2011 | Nugent | G06N 3/04 706/26 |
| 2015/0106316 A1* | 4/2015 | Birdwell | G06N 3/063 706/33 |

OTHER PUBLICATIONS

Strain, Thomas J., et al. "A supervised STDP based training algorithm with dynamic threshold neurons." Neural Networks, 2006. IJCNN'06. International Joint Conference on. IEEE, 2006.*
Paugam-Moisy, Helene, Regis Martinez, and Samy Bengio. A supervised learning approach based on STDP and polychronization in spiking neuron networks. No. LIDIAP-REPORT-2006-041. IDIAP, 2006.*
Yan Xu, Xiaoqin Zeng, Lixin Han, Jing Yang, a supervised multi-spike learning algorithm based on gradient descent for spiking neural networks, Neural Networks, vol. 43, Jul. 2013, pp. 99-113.*
Bekolay, T., et al., "Simultaneous Unsupervised and Supervised Learning of Cognitive Functions in Biologically Plausible Spiking Neural Networks," Proceedings of the 35th Annual Conference of the Cognitive Science Society, 2013, pp. 169-174.
International Search Report and Written Opinion—PCT/US2014/060234—ISA/EPO—May 7, 2015.
Paugam-Moisy H., et al., "Delay learning and polychronization for reservoir computing," Eurocomputing, vol. 71, No. 7-9, Feb. 1, 2008, pp. 1143-1158, XP022537752, DOI: 10.1016/J.NEUCOM.2007.12.027.

(Continued)

*Primary Examiner* — Stanley K Hill
*Assistant Examiner* — David H Kim
(74) *Attorney, Agent, or Firm* — Patterson & Sheridan, LLP

(57) ABSTRACT

Certain aspects of the present disclosure provide methods and apparatus for creating tags (static or dynamic) for input/output classes of a neural network model using supervised learning. The method includes augmenting a neural network model with a plurality of neurons and training the augmented network using spike timing dependent plasticity (STDP) to determine one or more tags.

22 Claims, 29 Drawing Sheets

(56) References Cited

OTHER PUBLICATIONS

Querlioz D., et al., "Bioinspired networks with nanoscale memristive devices that combine the unsupervised and supervised learning approaches", Proceedings of the 2012 IEEE/ACM International Symposium on Nanoscale Architectures (Nanoarch'12), Jul. 4, 2012, pp. 203-210, XP032332257, ISBN: 978-1-4503-1671-2.

Rheaume F., "A new liquid state machine method for temporal classification", Department of Electrical and Computer Engineering, University Laval (Quebec), Nov. 2012, XP055184684, Retrieved from the Internet: http://www.theses.ulaval.ca/2012/28815/ [retrieved on Apr. 21, 2015], chapter 6., 16 pages.

Strain T.J., et al., "An STDP training algorithm for a spiking neural network with dynamic threshold neurons", International Journal of Neural Systems, vol. 20, No. 6, Dec. 2010, pp. 463-480, XP008176072, DOI: 10.1142/S0129065710002553.

Wade J.J., et al., "SWAT: a spiking neural network training algorithm for classification problems", IEEE Transactions on Neural Networks, vol. 21, No. 11, Nov. 2010, pp. 1817-1830, XP011328378, DOI: 10.1109/TNN.2010.2074212.

Yu Q., et al., "Rapid Feedforward computation by temporal encoding and learning with spiking neurons", IEEE Transactions on Neural Networks and Learning Systems, vol. 24, No. 10, Feb. 22, 2013, pp. 1539-1552, XP011528216, DOI: 10.1109/TNNLS.2013.2245677.

* cited by examiner plasticity rule for excitatory synapses plasticity rule for inhibitory synapses

METHODS AND APPARATUS FOR TAGGING CLASSES USING SUPERVISED LEARNING

TECHNICAL FIELD

Certain aspects of the present disclosure generally relate to neural networks and, more particularly, to tagging classes using supervised learning.

BACKGROUND

An artificial neural network is a mathematical or computational model composed of an interconnected group of artificial neurons (i.e., neuron models). Artificial neural networks may be derived from (or at least loosely based on) the structure and/or function of biological neural networks, such as those found in the human brain. Because artificial neural networks can infer a function from observations, such networks are particularly useful in applications where the complexity of the task or data makes designing this function by hand impractical.

One type of artificial neural network is the spiking neural network, which incorporates the concept of time into its operating model, as well as neuronal and synaptic state, thereby increasing the level of realism in this type of neural simulation. Spiking neural networks are based on the concept that neurons fire only when a membrane potential reaches a threshold. When a neuron fires, it generates a spike that travels to other neurons which, in turn, raise or lower their membrane potentials based on this received spike.

Unsupervised learning algorithms accurately separate data into distinct classes in many applications, but they may not provide consistent indices for the classes they separate. Instead, a class index representing a certain data type may be randomly assigned to different classes. This random assignment may be undesirable in many applications, especially when the classification output is used as an input to one or more downstream modules. Without class indices that consistently represent the same class, it may not be possible to build a reliable interface between the module implementing unsupervised learning algorithm and the downstream modules.

SUMMARY

Certain aspects of the present disclosure propose a method for tagging classes. The method generally includes identifying a first network comprising one or more indexed classes of artificial neurons and determining one or more tags for the one or more classes of artificial neurons regardless of their indexing.

Certain aspects of the present disclosure propose an apparatus for tagging classes. The apparatus generally includes means for identifying a first network comprising one or more indexed classes of artificial neurons and means for determining one or more tags for the one or more classes of artificial neurons regardless of their indexing.

Certain aspects of the present disclosure propose an apparatus for tagging classes. The apparatus generally includes at least one processor configured to identify a first network comprising one or more indexed classes of artificial neurons and determine one or more tags for the one or more classes of artificial neurons regardless of their indexing and a memory coupled with the at least one processor.

Certain aspects of the present disclosure propose a program product for tagging classes. The program product generally includes a computer readable medium having instructions stored thereon for identifying a first network comprising one or more indexed classes of artificial neurons, and determining one or more tags for the one or more classes of artificial neurons regardless of their indexing.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Neural System, Training and Operation

Figure 1:
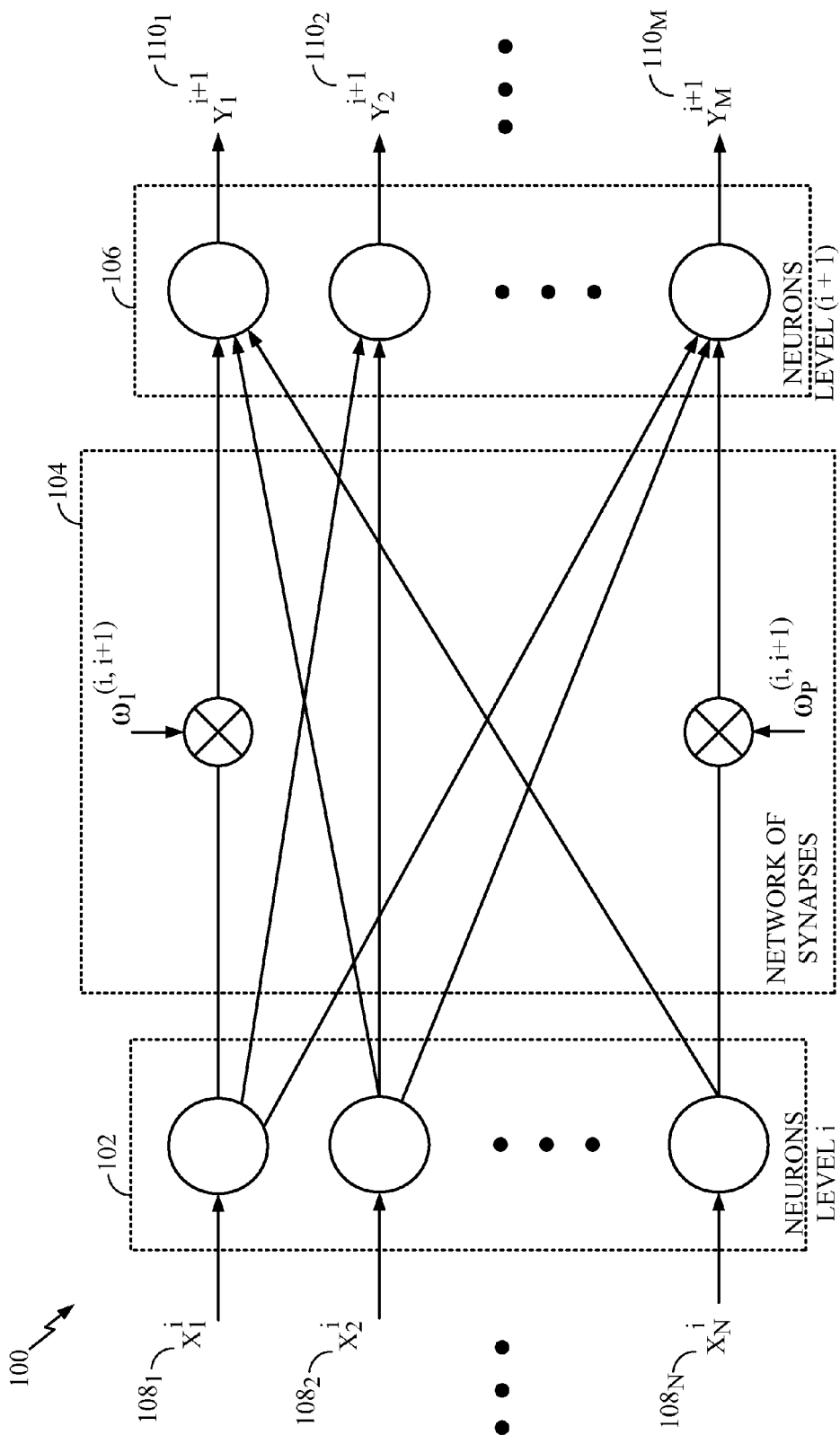
FIG. 1 illustrates an example network of neurons in accordance with certain aspects of the present disclosure.

FIG. 1 illustrates an example neural system 100 with multiple levels of neurons in accordance with certain aspects of the present disclosure. The neural system 100 may comprise a level of neurons 102 connected to another level of neurons 106 though a network of synaptic connections 104 (i.e., feed-forward connections). For simplicity, only two levels of neurons are illustrated in FIG. 1, although fewer or more levels of neurons may exist in a typical neural system. It should be noted that some of the neurons may connect to other neurons of the same layer through lateral connections. Furthermore, some of the neurons may connect back to a neuron of a previous layer through feedback connections.

As illustrated in FIG. 1, each neuron in the level 102 may receive an input signal 108 that may be generated by a plurality of neurons of a previous level (not shown in FIG. 1). The signal 108 may represent an input current of the level 102 neuron. This current may be accumulated on the neuron membrane to charge a membrane potential. When the membrane potential reaches its threshold value, the neuron may fire and generate an output spike to be transferred to the next level of neurons (e.g., the level 106). Such behavior can be emulated or simulated in hardware and/or software, including analog and digital implementations.

In biological neurons, the output spike generated when a neuron fires is referred to as an action potential. This electrical signal is a relatively rapid, transient, all-or nothing nerve impulse, having an amplitude of roughly 100 mV and a duration of about 1 ms. In a particular embodiment of a neural system having a series of connected neurons (e.g., the transfer of spikes from one level of neurons to another in FIG. 1), every action potential has basically the same amplitude and duration, and thus, the information in the signal is represented only by the frequency and number of spikes, or the time of spikes, not by the amplitude. The information carried by an action potential is determined by the spike, the neuron that spiked, and the time of the spike relative to other spike or spikes.

The transfer of spikes from one level of neurons to another may be achieved through the network of synaptic connections (or simply "synapses") 104, as illustrated in FIG. 1. The synapses 104 may receive output signals (i.e., spikes) from the level 102 neurons (pre-synaptic neurons relative to the synapses 104), and scale those signals according to adjustable synaptic weights $w_1^{(i,i+1)}, \ldots, w_P^{(i,i+1)}$ (where P is a total number of synaptic connections between the neurons of levels 102 and 106). Further, the scaled signals may be combined as an input signal of each neuron in the level 106 (post-synaptic neurons relative to the synapses 104). Every neuron in the level 106 may generate output spikes 110 based on the corresponding combined input signal. The output spikes 110 may be then transferred to another level of neurons using another network of synaptic connections (not shown in FIG. 1).

Biological synapses may be classified as either electrical or chemical. While electrical synapses are used primarily to send excitatory signals, chemical synapses can mediate either excitatory or inhibitory (hyperpolarizing) actions in postsynaptic neurons and can also serve to amplify neuronal signals. Excitatory signals typically depolarize the membrane potential (i.e., increase the membrane potential with respect to the resting potential). If enough excitatory signals are received within a certain time period to depolarize the membrane potential above a threshold, an action potential occurs in the postsynaptic neuron. In contrast, inhibitory signals generally hyperpolarize (i.e., lower) the membrane potential. Inhibitory signals, if strong enough, can counteract the sum of excitatory signals and prevent the membrane potential from reaching threshold. In addition to counteracting synaptic excitation, synaptic inhibition can exert powerful control over spontaneously active neurons. A spontaneously active neuron refers to a neuron that spikes without further input, for example due to its dynamics or a feedback. By suppressing the spontaneous generation of action potentials in these neurons, synaptic inhibition can shape the pattern of firing in a neuron, which is generally referred to as sculpturing. The various synapses 104 may act as any combination of excitatory or inhibitory synapses, depending on the behavior desired.

The neural system 100 may be emulated by a general purpose processor, a digital signal processor (DSP), an application specific integrated circuit (ASIC), a field programmable gate array (FPGA) or other programmable logic device (PLD), discrete gate or transistor logic, discrete hardware components, a software module executed by a processor, or any combination thereof. The neural system 100 may be utilized in a large range of applications, such as image and pattern recognition, machine learning, motor control, and alike. Each neuron in the neural system 100 may be implemented as a neuron circuit. The neuron membrane charged to the threshold value initiating the output spike may be implemented, for example, as a capacitor that integrates an electrical current flowing through it.

In an aspect, the capacitor may be eliminated as the electrical current integrating device of the neuron circuit, and a smaller memristor element may be used in its place. This approach may be applied in neuron circuits, as well as in various other applications where bulky capacitors are utilized as electrical current integrators. In addition, each of the synapses 104 may be implemented based on a memristor element, wherein synaptic weight changes may relate to changes of the memristor resistance. With nanometer feature-sized memristors, the area of neuron circuit and synapses may be substantially reduced, which may make implementation of a very large-scale neural system hardware implementation practical.

Functionality of a neural processor that emulates the neural system 100 may depend on weights of synaptic connections, which may control strengths of connections between neurons. The synaptic weights may be stored in a non-volatile memory in order to preserve functionality of the processor after being powered down. In an aspect, the synaptic weight memory may be implemented on a separate external chip from the main neural processor chip. The synaptic weight memory may be packaged separately from the neural processor chip as a replaceable memory card. This may provide diverse functionalities to the neural processor, wherein a particular functionality may be based on synaptic weights stored in a memory card currently attached to the neural processor.

Figure 2:
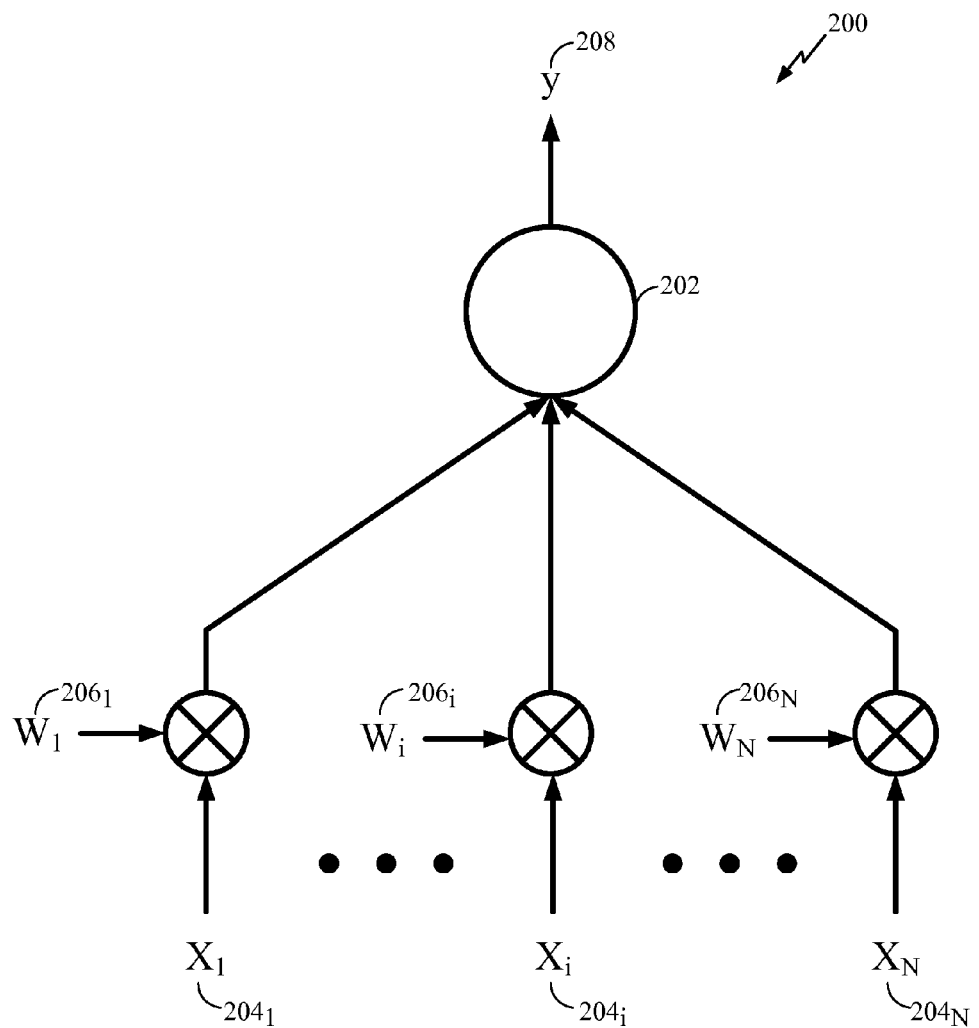
FIG. 2 illustrates example of a processing unit (neuron) of a computational network (neural system or neural network) in accordance with certain aspects of the present disclosure.

FIG. 2 illustrates an example 200 of a processing unit (e.g., a neuron or neuron circuit) 202 of a computational network (e.g., a neural system or a neural network) in accordance with certain aspects of the present disclosure. For example, the neuron 202 may correspond to any of the neurons of levels 102 and 106 from FIG. 1. The neuron 202 may receive multiple input signals 204$_1$-204$_N$ (x1-xN), which may be signals external to the neural system, or signals generated by other neurons of the same neural system, or both. The input signal may be a current or a voltage, real-valued or complex-valued. The input signal may comprise a numerical value with a fixed-point or a floating-point representation. These input signals may be delivered to the neuron 202 through synaptic connections that scale the signals according to adjustable synaptic weights 206$_1$-206$_N$ (w1-wN), where N may be a total number of input connections of the neuron 202.

The neuron 202 may combine the scaled input signals and use the combined scaled inputs to generate an output signal 208 (i.e., a signal y). The output signal 208 may be a current, or a voltage, real-valued or complex-valued. The output signal may comprise a numerical value with a fixed-point or a floating-point representation. The output signal 208 may be then transferred as an input signal to other neurons of the same neural system, or as an input signal to the same neuron 202, or as an output of the neural system.

The processing unit (neuron) 202 may be emulated by an electrical circuit, and its input and output connections may be emulated by wires with synaptic circuits. The processing unit 202, its input and output connections may also be emulated by a software code. The processing unit 202 may also be emulated by an electric circuit, whereas its input and output connections may be emulated by a software code. In an aspect, the processing unit 202 in the computational network may comprise an analog electrical circuit. In another aspect, the processing unit 202 may comprise a digital electrical circuit. In yet another aspect, the processing unit 202 may comprise a mixed-signal electrical circuit with both analog and digital components. The computational network may comprise processing units in any of the aforementioned forms. The computational network (neural system or neural network) using such processing units may be utilized in a large range of applications, such as image and pattern recognition, machine learning, motor control, and alike.

During the course of training of neural network, synaptic weights (e.g., the weights $w_1^{(i,i+1)}, \ldots, w_P^{(i,i+1)}$ from FIG. 1 and/or the weights 206$_1$-206$_N$ from FIG. 2) may be initialized with random values and increased or decreased according to a learning rule. Some examples of the learning rule are the spike-timing-dependent plasticity (STDP) learning rule, the Hebb rule, the Oja rule, the Bienenstock-Copper-Munro (BCM) rule, etc. Very often, the weights may settle to one of two values (i.e., a bimodal distribution of weights). This effect can be utilized to reduce the number of bits per synaptic weight, increase the speed of reading and writing from/to a memory storing the synaptic weights, and to reduce power consumption of the synaptic memory.

Synapse Type

In hardware and software models of neural networks, processing of synapse related functions can be based on synaptic type. Synapse types may comprise non-plastic synapses (no changes of weight and delay), plastic synapses (weight may change), structural delay plastic synapses (weight and delay may change), fully plastic synapses (weight, delay and connectivity may change), and variations thereupon (e.g., delay may change, but no change in weight or connectivity). The advantage of this is that processing can be subdivided. For example, non-plastic synapses may not require plasticity functions to be executed (or waiting for such functions to complete). Similarly, delay and weight plasticity may be subdivided into operations that may operate together or separately, in sequence or in parallel. Different types of synapses may have different lookup tables or formulas and parameters for each of the different plasticity types that apply. Thus, the methods would access the relevant tables for the synapse's type.

There are further implications of the fact that spike-timing dependent structural plasticity may be executed independently of synaptic plasticity. Structural plasticity may be executed even if there is no change to weight magnitude (e.g., if the weight has reached a minimum or maximum value, or it is not changed due to some other reason) since structural plasticity (i.e., an amount of delay change) may be a direct function of pre-post spike time difference. Alternatively, it may be set as a function of the weight change amount or based on conditions relating to bounds of the weights or weight changes. For example, a synapse delay may change only when a weight change occurs or if weights reach zero but not if they are maxed out. However, it can be advantageous to have independent functions so that these processes can be parallelized reducing the number and overlap of memory accesses.

Determination of Synaptic Plasticity

Neuroplasticity (or simply "plasticity") is the capacity of neurons and neural networks in the brain to change their synaptic connections and behavior in response to new information, sensory stimulation, development, damage, or dysfunction. Plasticity is important to learning and memory in biology, as well as for computational neuroscience and neural networks. Various forms of plasticity have been studied, such as synaptic plasticity (e.g., according to the Hebbian theory), spike-timing-dependent plasticity (STDP), non-synaptic plasticity, activity-dependent plasticity, structural plasticity and homeostatic plasticity.

STDP is a learning process that adjusts the strength of synaptic connections between neurons. The connection strengths are adjusted based on the relative timing of a particular neuron's output and received input spikes (i.e., action potentials). Under the STDP process, long-term potentiation (LTP) may occur if an input spike to a certain neuron tends, on average, to occur immediately before that neuron's output spike. Then, that particular input is made somewhat stronger. On the other hand, long-term depression (LTD) may occur if an input spike tends, on average, to occur immediately after an output spike. Then, that particular input is made somewhat weaker, and hence the name "spike-timing-dependent plasticity". Consequently, inputs that might be the cause of the post-synaptic neuron's excitation are made even more likely to contribute in the future, whereas inputs that are not the cause of the post-synaptic spike are made less likely to contribute in the future. The process continues until a subset of the initial set of connections remains, while the influence of all others is reduced to zero or near zero.

Since a neuron generally produces an output spike when many of its inputs occur within a brief period, i.e., being cumulative sufficient to cause the output, the subset of inputs that typically remains includes those that tended to be correlated in time. In addition, since the inputs that occur before the output spike are strengthened, the inputs that provide the earliest sufficiently cumulative indication of correlation will eventually become the final input to the neuron.

The STDP learning rule may effectively adapt a synaptic weight of a synapse connecting a pre-synaptic neuron to a post-synaptic neuron as a function of time difference between spike time $t_{pre}$ of the pre-synaptic neuron and spike time $t_{post}$ of the post-synaptic neuron (i.e., $t=t_{post}-t_{pre}$). A typical formulation of the STDP is to increase the synaptic weight (i.e., potentiate the synapse) if the time difference is positive (the pre-synaptic neuron fires before the post-synaptic neuron), and decrease the synaptic weight (i.e., depress the synapse) if the time difference is negative (the post-synaptic neuron fires before the pre-synaptic neuron).

In the STDP process, a change of the synaptic weight over time may be typically achieved using an exponential decay, as given by, $$\Delta w(t) = \begin{cases} a_+ e^{-t/k_+} + \mu, & t > 0 \\ a_- e^{t/k_-}, & t < 0 \end{cases} \quad (1)$$

where $k_+$ and $k_-$ are time constants for positive and negative time difference, respectively, $a_+$ and $a_-$ are corresponding scaling magnitudes, and $\mu$ is an offset that may be applied to the positive time difference and/or the negative time difference.

Figure 3:
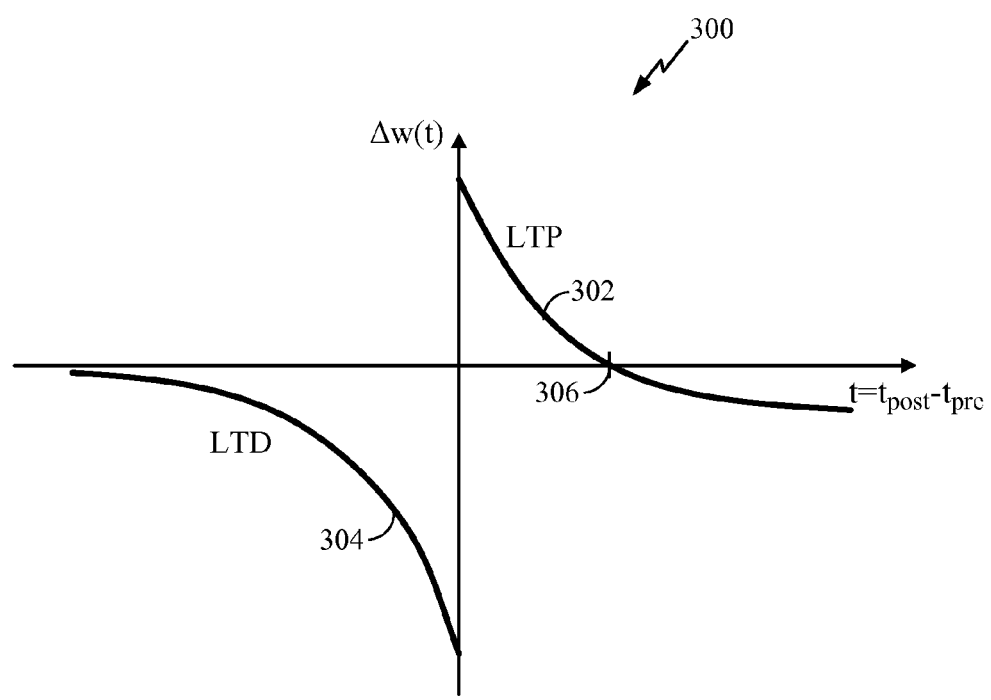
FIG. 3 illustrates an example of spike-timing dependent plasticity (STDP) curve in accordance with certain aspects of the present disclosure.

FIG. 3 illustrates an example graph diagram 300 of a synaptic weight change as a function of relative timing of pre-synaptic and post-synaptic spikes in accordance with the STDP. If a pre-synaptic neuron fires before a post-synaptic neuron, then a corresponding synaptic weight may be increased, as illustrated in a portion 302 of the graph 300. This weight increase can be referred to as an LTP of the synapse. It can be observed from the graph portion 302 that the amount of LTP may decrease roughly exponentially as a function of the difference between pre-synaptic and post-synaptic spike times. The reverse order of firing may reduce the synaptic weight, as illustrated in a portion 304 of the graph 300, causing an LTD of the synapse.

As illustrated in the graph 300 in FIG. 3, a negative offset $\mu$ may be applied to the LTP (causal) portion 302 of the STDP graph. A point of cross-over 306 of the x-axis (y=0) may be configured to coincide with the maximum time lag for considering correlation for causal inputs from layer i-1. In the case of a frame-based input (i.e., an input is in the form of a frame of a particular duration comprising spikes or pulses), the offset value $\mu$ can be computed to reflect the frame boundary. A first input spike (pulse) in the frame may be considered to decay over time either as modeled by a post-synaptic potential directly or in terms of the effect on neural state. If a second input spike (pulse) in the frame is considered correlated or relevant of a particular time frame, then the relevant times before and after the frame may be separated at that time frame boundary and treated differently in plasticity terms by offsetting one or more parts of the STDP curve such that the value in the relevant times may be different (e.g., negative for greater than one frame and positive for less than one frame). For example, the negative offset $\mu$ may be set to offset LTP such that the curve actually goes below zero at a pre-post time greater than the frame time and it is thus part of LTD instead of LTP.

Neuron Models and Operation

There are some general principles for designing a useful spiking neuron model. A good neuron model may have rich potential behavior in terms of two computational regimes: coincidence detection and functional computation. Moreover, a good neuron model should have two elements to allow temporal coding: arrival time of inputs affects output time and coincidence detection can have a narrow time window. Finally, to be computationally attractive, a good neuron model may have a closed-form solution in continuous time and have stable behavior including near attractors and saddle points. In other words, a useful neuron model is one that is practical and that can be used to model rich, realistic and biologically-consistent behaviors, as well as be used to both engineer and reverse engineer neural circuits.

A neuron model may depend on events, such as an input arrival, output spike or other event whether internal or external. To achieve a rich behavioral repertoire, a state machine that can exhibit complex behaviors may be desired. If the occurrence of an event itself, separate from the input contribution (if any) can influence the state machine and constrain dynamics subsequent to the event, then the future state of the system is not only a function of a state and input, but rather a function of a state, event, and input.

In an aspect, a neuron n may be modeled as a spiking leaky-integrate-and-fire neuron with a membrane voltage $v_n(t)$ governed by the following dynamics, $$\frac{dv_n(t)}{dt} = \alpha v_n(t) + \beta \sum_m w_{m,n} y_m(t - \Delta t_{m,n}), \tag{2}$$

where $\alpha$ and $\beta$ are parameters, $w_{m,n}$ is a synaptic weight for the synapse connecting a pre-synaptic neuron m to a post-synaptic neuron n, and $y_m(t)$ is the spiking output of the neuron m that may be delayed by dendritic or axonal delay according to $\Delta t_{m,n}$ until arrival at the neuron n's soma.

It should be noted that there is a delay from the time when sufficient input to a post-synaptic neuron is established until the time when the post-synaptic neuron actually fires. In a dynamic spiking neuron model, such as Izhikevich's simple model, a time delay may be incurred if there is a difference between a depolarization threshold $v_t$ and a peak spike voltage $v_{peak}$. For example, in the simple model, neuron soma dynamics can be governed by the pair of differential equations for voltage and recovery, i.e., $$\frac{dv}{dt} = (k(v - v_t)(v - v_r) - u + I)/C, \tag{3}$$

$$\frac{du}{dt} = a(b(v - v_r) - u). \tag{4}$$

where v is a membrane potential, u is a membrane recovery variable, k is a parameter that describes time scale of the membrane potential v, a is a parameter that describes time scale of the recovery variable u, b is a parameter that describes sensitivity of the recovery variable u to the sub-threshold fluctuations of the membrane potential v, $v_r$ is a membrane resting potential, I is a synaptic current, and C is a membrane's capacitance. In accordance with this model, the neuron is defined to spike when $v > v_{peak}$.

Hunzinger Cold Model

The Hunzinger Cold neuron model is a minimal dual-regime spiking linear dynamical model that can reproduce a rich variety of neural behaviors. The model's one- or two-dimensional linear dynamics can have two regimes, wherein the time constant (and coupling) can depend on the regime. In the sub-threshold regime, the time constant, negative by convention, represents leaky channel dynamics generally acting to return a cell to rest in biologically-consistent linear fashion. The time constant in the supra-threshold regime, positive by convention, reflects anti-leaky channel dynamics generally driving a cell to spike while incurring latency in spike-generation.

Figure 4:
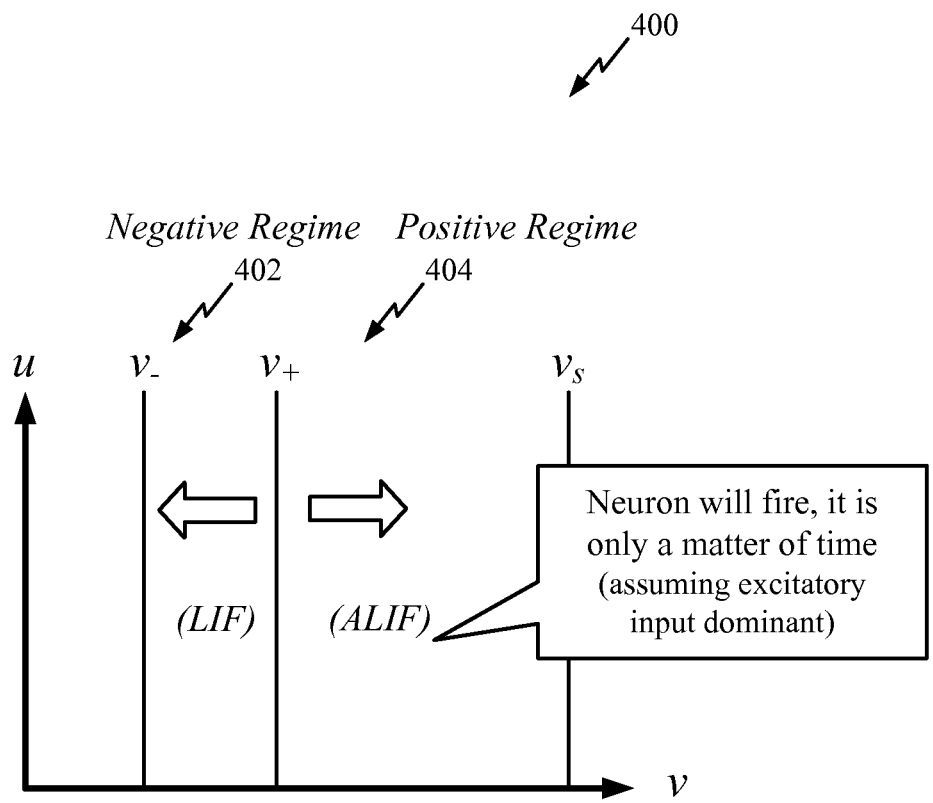
FIG. 4 illustrates an example of a positive regime and a negative regime for defining behavior of a neuron model in accordance with certain aspects of the present disclosure.

As illustrated in FIG. 4, the dynamics of the model may be divided into two (or more) regimes. These regimes may be called the negative regime 402 (also interchangeably referred to as the leaky-integrate-and-fire (LIF) regime, not to be confused with the LIF neuron model) and the positive regime 404 (also interchangeably referred to as the anti-leaky-integrate-and-fire (ALIF) regime, not to be confused with the ALIF neuron model). In the negative regime 402, the state tends toward rest ($v_-$) at the time of a future event. In this negative regime, the model generally exhibits temporal input detection properties and other sub-threshold behavior. In the positive regime 404, the state tends toward a spiking event ($v_s$). In this positive regime, the model exhibits computational properties, such as incurring a latency to spike depending on subsequent input events. Formulation of dynamics in terms of events and separation of the dynamics into these two regimes are fundamental characteristics of the model.

Linear dual-regime bi-dimensional dynamics (for states v and u) may be defined by convention as, $$\tau_\rho \frac{dv}{dt} = v + q_\rho \tag{5}$$

$$-\tau_u \frac{du}{dt} = u + r \tag{6}$$

where $q_\rho$ and r are the linear transformation variables for coupling.

The symbol $\rho$ is used herein to denote the dynamics regime with the convention to replace the symbol $\rho$ with the sign "−" or "+" for the negative and positive regimes, respectively, when discussing or expressing a relation for a specific regime.

The model state is defined by a membrane potential (voltage) v and recovery current u. In basic form, the regime is essentially determined by the model state. There are subtle, but important aspects of the precise and general definition, but for the moment, consider the model to be in the positive regime 404 if the voltage v is above a threshold ($v_-$) and otherwise in the negative regime 402.

The regime-dependent time constants include $\tau_-$ which is the negative regime time constant, and $\tau_+$ which is the positive regime time constant. The recovery current time constant $\tau_u$ is typically independent of regime. For convenience, the negative regime time constant $\tau_-$ is typically specified as a negative quantity to reflect decay so that the same expression for voltage evolution may be used as for the positive regime in which the exponent and $\tau_+$ will generally be positive, as will be $\tau_u$.

The dynamics of the two state elements may be coupled at events by transformations offsetting the states from their null-clines, where the transformation variables are $$q_\rho = -\tau_\rho \beta u - v_\rho \tag{7}$$

$$r = \delta(v + \epsilon) \tag{8}$$

where $\delta$, $\epsilon$, $\beta$ and $v_-$, $v_+$ are parameters. The two values for $v_\rho$ are the base for reference voltages for the two regimes. The parameter $v_-$ is the base voltage for the negative regime, and the membrane potential will generally decay toward $v_-$ in the negative regime. The parameter is the base voltage for the positive regime, and the membrane potential will generally tend away from in the positive regime.

The null-clines for v and u are given by the negative of the transformation variables $q_\rho$ and r, respectively. The parameter $\delta$ is a scale factor controlling the slope of the u null-cline. The parameter $\epsilon$ is typically set equal to $-v_-$. The parameter $\beta$ is a resistance value controlling the slope of the v null-clines in both regimes. The $\tau_\rho$ time-constant parameters control not only the exponential decays, but also the null-cline slopes in each regime separately.

The model is defined to spike when the voltage v reaches a value $v_s$. Subsequently, the state is typically reset at a reset event (which technically may be one and the same as the spike event):

$$v = \hat{v}_- \tag{9}$$

$$u = u + \Delta u \tag{10}$$

where $\hat{v}_-$ and $\Delta u$ are parameters. The reset voltage $\hat{v}_-$ is typically set to $v_-$.

By a principle of momentary coupling, a closed form solution is possible not only for state (and with a single exponential term), but also for the time required to reach a particular state. The close form state solutions are $$v(t + \Delta t) = (v(t) + q_\rho)e^{\frac{\Delta t}{\tau_\rho}} - q_\rho \qquad (11)$$

$$u(t + \Delta t) = (u(t) + r)e^{-\frac{\Delta t}{\tau_u}} - r \qquad (12)$$

Therefore, the model state may be updated only upon events such as upon an input (pre-synaptic spike) or output (post-synaptic spike). Operations may also be performed at any particular time (whether or not there is input or output).

Moreover, by the momentary coupling principle, the time of a post-synaptic spike may be anticipated so the time to reach a particular state may be determined in advance without iterative techniques or Numerical Methods (e.g., the Euler numerical method). Given a prior voltage state $v_0$, the time delay until voltage state $v_f$ is reached is given by $$\Delta t = \tau_\rho \log \frac{v_f + q_\rho}{v_0 + q_\rho} \qquad (13)$$

If a spike is defined as occurring at the time the voltage state v reaches $v_s$, then the closed-form solution for the amount of time, or relative delay, until a spike occurs as measured from the time that the voltage is at a given state v is $$\Delta t_S = \begin{cases} \tau_+ \log \frac{v_S + q_+}{v + q_+} & \text{if } v > \hat{v}_+ \\ \infty & \text{otherwise} \end{cases} \qquad (14)$$

where $\hat{v}_+$ is typically set to parameter $v_+$, although other variations may be possible.

The above definitions of the model dynamics depend on whether the model is in the positive or negative regime. As mentioned, the coupling and the regime ρ may be computed upon events. For purposes of state propagation, the regime and coupling (transformation) variables may be defined based on the state at the time of the last (prior) event. For purposes of subsequently anticipating spike output time, the regime and coupling variable may be defined based on the state at the time of the next (current) event.

There are several possible implementations of the Cold model, and executing the simulation, emulation or model in time. This includes, for example, event-update, step-event update, and step-update modes. An event update is an update where states are updated based on events or "event update" (at particular moments). A step update is an update when the model is updated at intervals (e.g., 1 ms). This does not necessarily require iterative methods or Numerical methods. An event-based implementation is also possible at a limited time resolution in a step-based simulator by only updating the model if an event occurs at or between steps or by "step-event" update.

Neural Coding

A useful neural network model, such as one comprised of the artificial neurons 102, 106 of FIG. 1, may encode information via any of various suitable neural coding schemes, such as coincidence coding, temporal coding or rate coding. In coincidence coding, information is encoded in the coincidence (or temporal proximity) of action potentials (spiking activity) of a neuron population. In temporal coding, a neuron encodes information through the precise timing of action potentials (i.e., spikes) whether in absolute time or relative time. Information may thus be encoded in the relative timing of spikes among a population of neurons. In contrast, rate coding involves coding the neural information in the firing rate or population firing rate.

If a neuron model can perform temporal coding, then it can also perform rate coding (since rate is just a function of timing or inter-spike intervals). To provide for temporal coding, a good neuron model should have two elements: (1) arrival time of inputs affects output time; and (2) coincidence detection can have a narrow time window. Connection delays provide one means to expand coincidence detection to temporal pattern decoding because by appropriately delaying elements of a temporal pattern, the elements may be brought into timing coincidence.

Arrival Time

In a good neuron model, the time of arrival of an input should have an effect on the time of output. A synaptic input—whether a Dirac delta function or a shaped post-synaptic potential (PSP), whether excitatory (EPSP) or inhibitory (IPSP)—has a time of arrival (e.g., the time of the delta function or the start or peak of a step or other input function), which may be referred to as the input time. A neuron output (i.e., a spike) has a time of occurrence (wherever it is measured, e.g., at the soma, at a point along the axon, or at an end of the axon), which may be referred to as the output time. That output time may be the time of the peak of the spike, the start of the spike, or any other time in relation to the output waveform. The overarching principle is that the output time depends on the input time.

One might at first glance think that all neuron models conform to this principle, but this is generally not true. For example, rate-based models do not have this feature. Many spiking models also do not generally conform. A leaky-integrate-and-fire (LIF) model does not fire any faster if there are extra inputs (beyond threshold). Moreover, models that might conform if modeled at very high timing resolution often will not conform when timing resolution is limited, such as to 1 ms steps.

Inputs

An input to a neuron model may include Dirac delta functions, such as inputs as currents, or conductance-based inputs. In the latter case, the contribution to a neuron state may be continuous or state-dependent.

For certain aspects, the neural system 100 may be used in a system that assigns tags to each of the output classes utilizing supervised learning, as described herein. These tags may be assigned statically (once) or dynamically (e.g., with tag assignments changing at times).

Exemplary Methods and Apparatus for Tagging Classes Using Supervised Learning

Unsupervised learning algorithms accurately separate data into distinct classes in many applications, but they may not provide consistent indices for the classes they separate. Instead, a class index representing a certain data type may be randomly assigned to different classes. This random assignment may be undesirable in many applications, especially when the classification output is used as an input to one or more downstream modules. Without class indices that consistently represent the same class, it may not be possible to build a reliable interface between the module implementing unsupervised learning algorithm and the downstream modules.

Certain aspects of the present disclosure present a method for tagging classes using supervised learning and spike-timing dependent plasticity (STDP). The proposed method may apply tags (static or dynamic) to any sequence of classes regardless of their indexing.

The method presented herein may augment any model with a neural network consisting of N output neurons (where N may represent number of desired classes) and all-to-all plastic connections between the arbitrarily indexed class neurons and the output neurons. This all-to-all connected neural network is then trained using supervised learning such that each output neuron always represents the same class. The supervised training is performed by sending in a known sequence of classes into the network and enforcing spiking and/or non-spiking activity at the output neurons.

Because the arbitrarily ordered class neuron will spike upon presentation of its class and the output neuron associated with this class has been forced to spike, there will be a coincidence of spikes between this pair of neurons and no other pair of neurons. This coincidence will cause the synaptic weight of the connection between this pair of neurons to be increased according to a STDP curve. By constructing this curve to increase the weight of coincidentally firing neurons and decrease the weight of non-coincidentally firing neurons, over time the only connections that will persist will be between pairs of neurons that represent the same class. Because the supervisory spiking signal was only sent to the desired output neuron, the same indexing of output class neurons will be achieved regardless of the indexing of the original class neuron. It should be noted that, in some cases, the spiking at the output neurons associated with classes other than the one being presented as input may be suppressed. Multiple output layer neurons carrying different labels may be associated with the output of the classifier.

Figure 5:
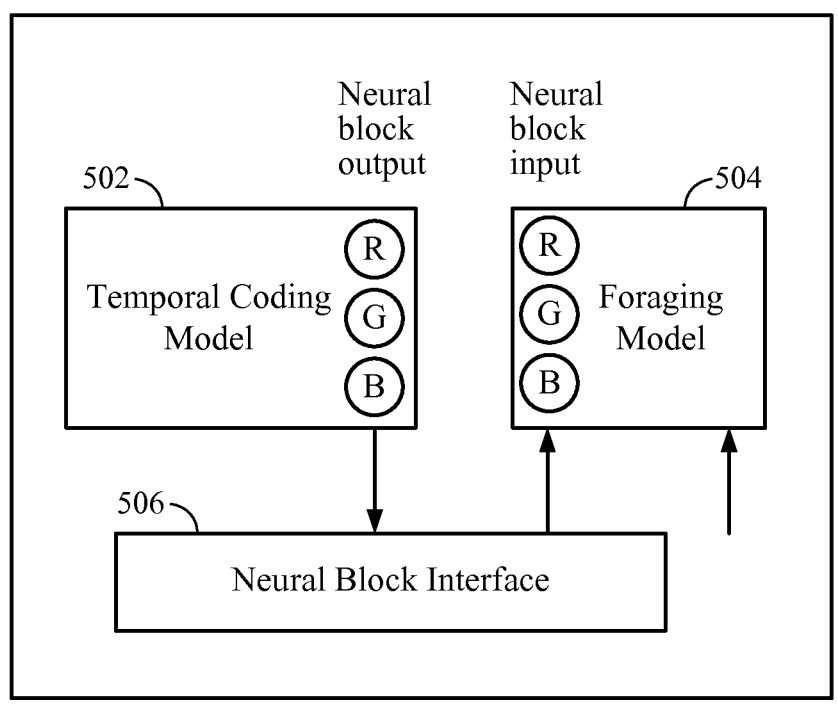
FIG. 5 illustrates an example high-level block diagram of a system utilizing a neural network block, in accordance with certain aspects of the present disclosure.

FIG. 5 illustrates an example high-level block diagram of a system utilizing a neural network, in accordance with certain aspects of the present disclosure. As illustrated, the temporal coding model 502 is connected to the foraging circuit 504 through a neural block interface 506. The temporal coding model 502 may use an unsupervised learning algorithm to separate data into different classes (e.g., red, blue, and green classes). The neural network interface needs to know correct specification/tag of each output class of the temporal coding model 502 in order to correctly connect them to input nodes of the foraging circuit 504.

Figure 6:
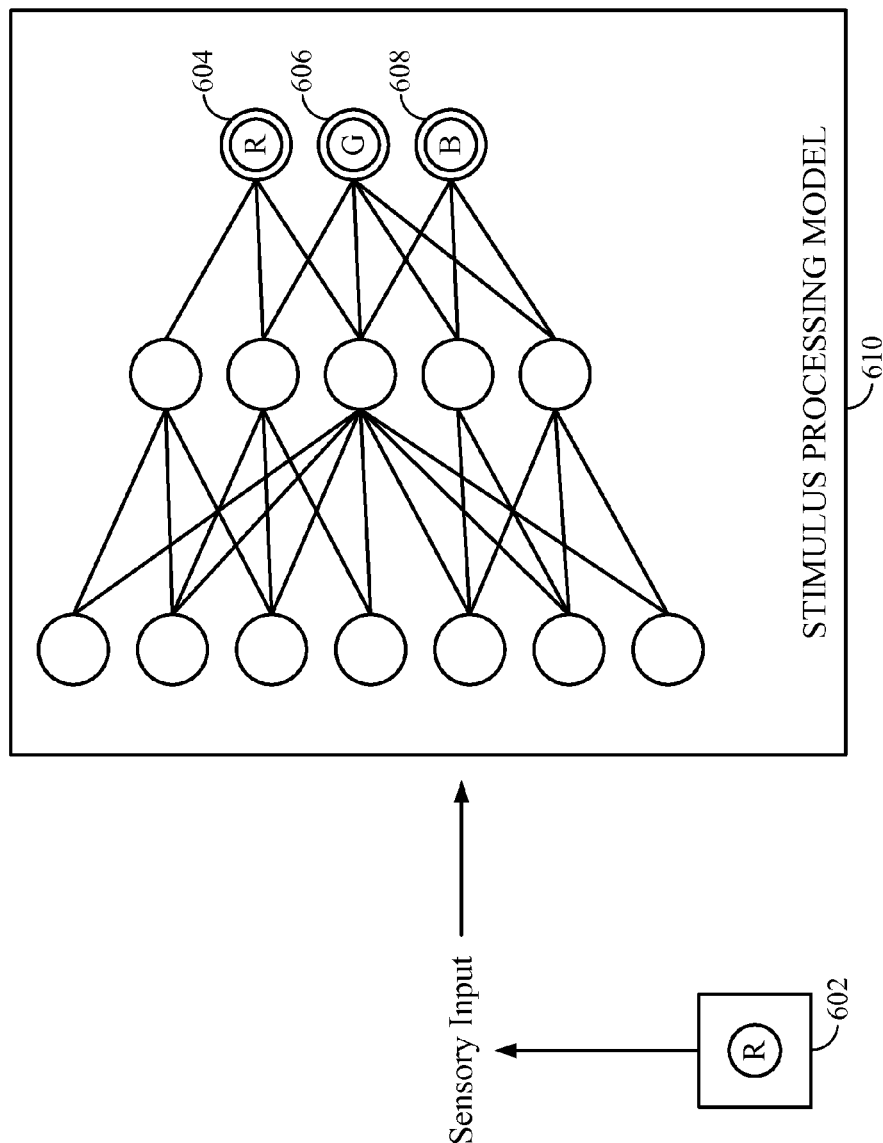
FIG. 6 illustrates an example stimulus processing model, in accordance with certain aspects of the present disclosure.

FIG. 6 illustrates an example stimulus processing model, in accordance with certain aspects of the present disclosure. As illustrated, the stimulus processing model 610 may process an input stimulus and generate one or more outputs/output classes. For example, the stimulus processing model may process a sensory input 602 and generate output class1 602, class2 604, class3 606. The input stimulus may randomly be assigned to one or more of the output classes 602, 604, and/or 606. As a result, the neuron representing the input stimulus 602 may be randomly located at the output layer of the stimulus processing model 610. Downstream neural blocks may need to assume a specific neuron or class of neurons to fire for a specific input stimulus (e.g., a red ball). Therefore, performance of the stimulus processing model may need to be observed. The stimulus processing model 610 may include a temporal coding block 506 and/or any other neural network block that may be used to process and/or classify data.

Certain aspects of the present disclosure provide a method for tagging classes that are generated by an unsupervised learning algorithm (e.g., such as the temporal coding block 506) with meaningful, tags. The tags that are generated with the proposed method are consistent regardless of the class index output from the unsupervised learning algorithm. For certain aspects, the tagging method presented herein may use a single-layer neural network combined with supervised learning and spike-timing dependent plasticity (STDP). It should be noted that although most of the examples presented herein assume a single-layer neural network, the teachings herein may be applied to any neural network with any number of layers, all of which fall within the scope of the present disclosure.

Figure 7:
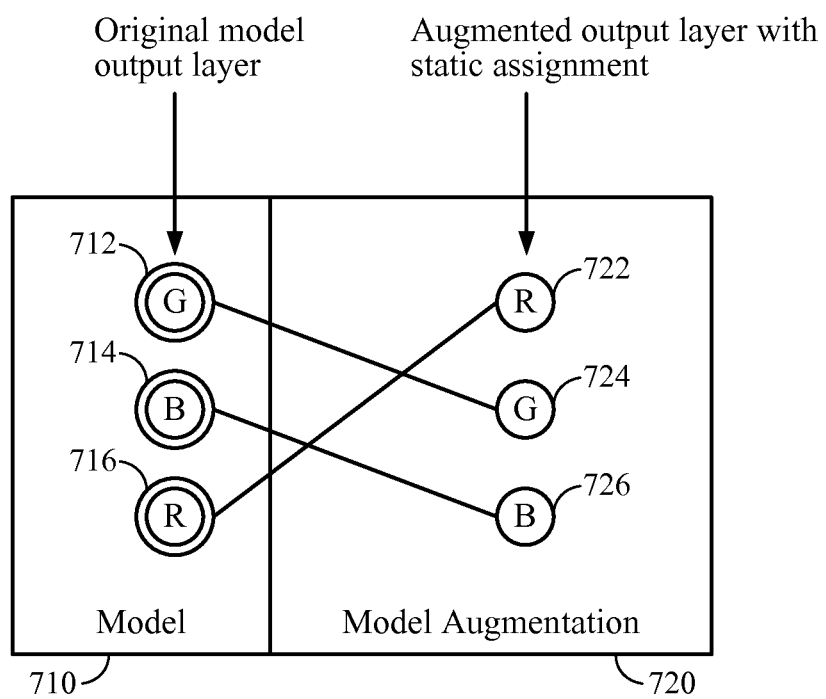
FIG. 7 illustrates an example method for tagging classes, in accordance with certain aspects of the present disclosure.

FIG. 7 illustrates an example block diagram of the proposed method for tagging classes, in accordance with certain aspects of the present disclosure. As illustrated, output nodes (and/or output classes of nodes) of a neural network model 710 may be connected to an augmented model 720. In this example, each node may represent an artificial neuron. Each of the outputs of the augmented model 720 may correspond to an assignment (e.g., a tag). For example, the output 722 may correspond to a red color, output 724 may correspond to a green color and output class 724 may correspond to a blue color. In addition, each of the outputs of the neural network model 710 may randomly correspond to one of the red, green, or blue colors. For example, output node 712 may correspond to green, output node 714 may correspond to blue, and output node 716 may correspond to the red color. The proposed solution enables a static mapping between stimulus class and one or more output neurons (nodes) representing that stimulus class. While certain aspects are described herein with reference to tags, the techniques described herein may also be used to dynamically assign tags, to achieve a dynamic mapping between stimulus class and one or more output neurons (e.g., to capture changes in a system environment).

Figure 8:
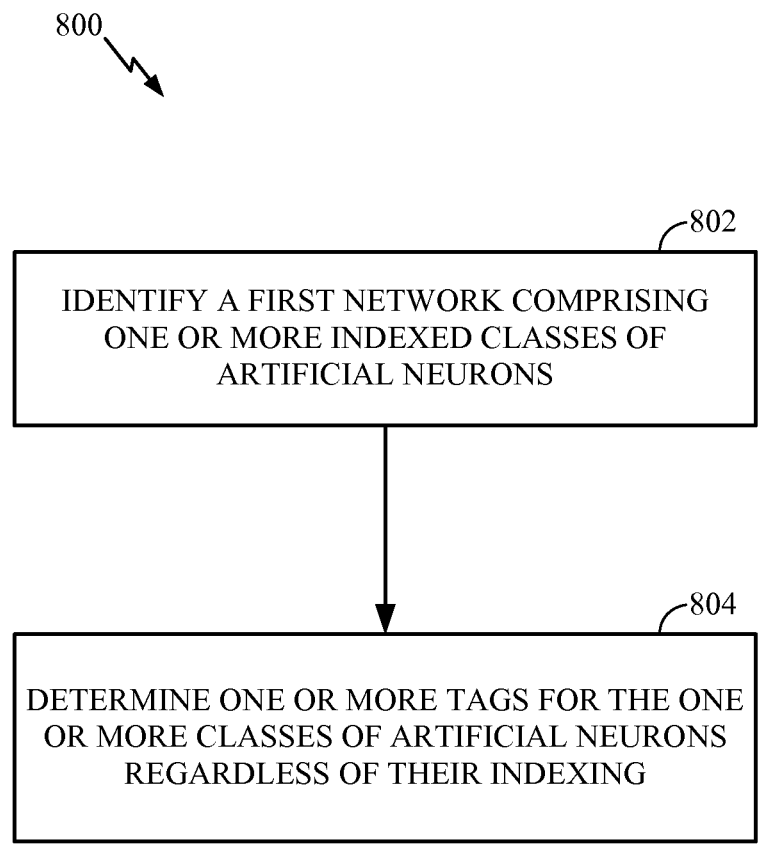
FIG. 8 illustrates example operations for tagging classes of nodes, in accordance with certain aspects of the present disclosure.

FIG. 8 illustrates example operations 800 for tagging classes of artificial neurons, in accordance with certain aspects of the present disclosure. At 802, a first network may be identified comprising one or more indexed classes of artificial neurons. At 804, one or more tags may be determined for the one or more classes of artificial neurons regardless of their indexing. As an example, the first network may be augmented with a second network that may include one or more artificial neurons, wherein each artificial neuron in the second network corresponds to a tag. Each of the one or more classes of artificial neurons may be connected to all of the artificial neurons in the second network with one or more plastic connections. The one or more plastic connections may be trained using a supervised learning algorithm such that each artificial neuron of the second network represents a specific class of the first network regardless of its indexing.

Figure 9A:
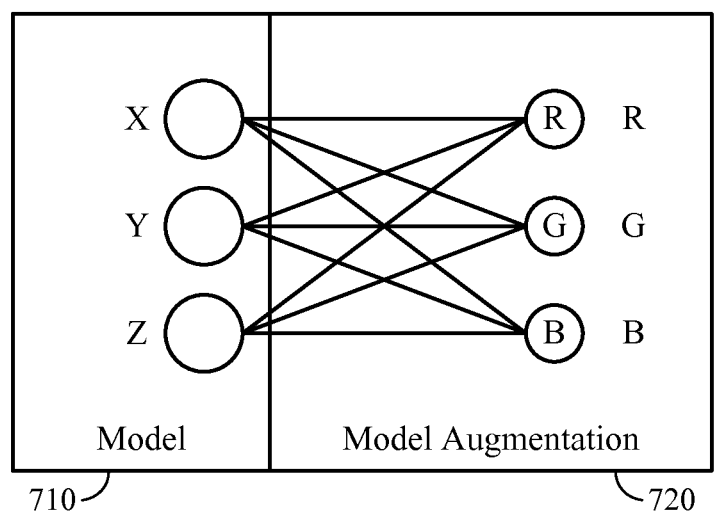
FIGS. 9A-9C illustrate the proposed tagging method, in accordance with certain aspects of the present disclosure.
Figure 9B:
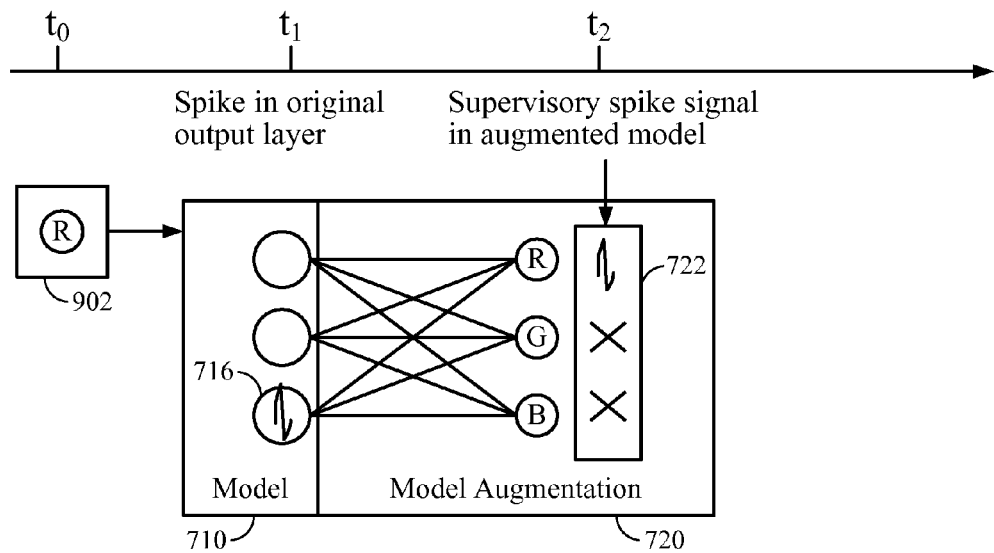
Figure 9C:
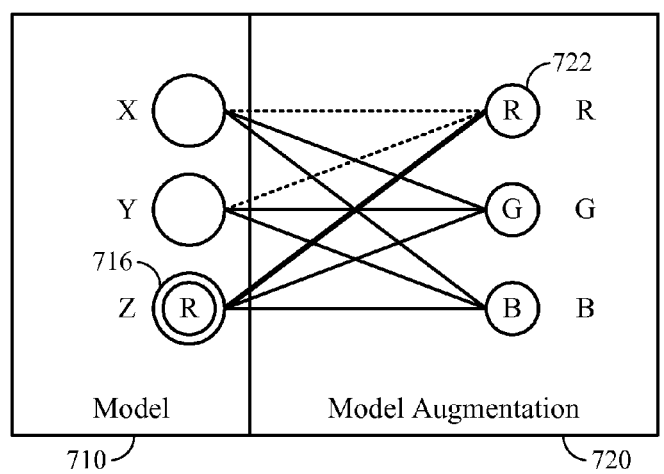

FIGS. 9A-9C illustrate the steps that may be taken for the proposed tagging method, in accordance with certain aspects of the present disclosure. FIG. 9A illustrates a neural network model 710 that is augmented with another neural network model (e.g., model augmentation 720). The nodes in the output layer nodes (e.g., artificial neurons) of the neural network model 710 are connected to all the nodes of the augmented model 720 through plastic synapses. Plastic synapses may change in strength in response to either use or disuse of the connection between the nodes. In this example, the augmented model 720 has only one layer of nodes, however, in general the augmented model may have any number of layers and any number of nodes.

FIG. 9B illustrates an example timing diagram for generating a spike in the neural network model 710 and generating a supervisory spike in the augmented model 720, in accordance with certain aspects of the present disclosure. As illustrated, at time $t_0$, a stimulus 902 may be presented to the neural network model 710. At time $t_1$, there may be a spike in the output layer of the neural network model 710 in response to the stimulus 902. For example, the output node 716 of the neural network model 710 may show a spike at time $t_1$. At time $t_2$, a supervisory spike signal may be generated in one of the outputs of the augmented model 720. For example, a supervisory spike may be generated at output node 722 of the augmented model 720. Next, weight of the plastic connections between nodes in the two networks 710 and 720 are determined based on the spikes at times $t_1$ and $t_2$. For example, synaptic weight from the node 716 that spiked at time $t_1$ (e.g., node Z) in the original model 710 to the neuron in the augmented model 720 representing stimulus (e.g., node R 722) is strengthened (e.g., $+\delta(Z \rightarrow R)$ in which $\delta$ is a positive number representing change in strength of connectivity of a connection). Therefore, the synaptic weight between nodes 716 and 722 is increased. In addition, if other nodes (e.g., X and/or Y) in the output layer of the original model 710 had spiked earlier, the plasticity rule weakens their association with the node R 722 in the augmented model (e.g., $-\delta(X \rightarrow R)$ and $-\delta(Y \rightarrow R)$, As illustrated by the "X" at output nodes G and B, the spiking at the output neurons associated with classes other than the one being presented as input may be suppressed.

FIG. 9C illustrates final connections between the nodes in the neural network model 710 and the node R 722 of the augmented model 720 after presenting the stimulus 902 to the models and applying the plasticity rule. In this figure, the tag R may be assigned to the node 716 of the original model 710, because weight of the plastic connection between the node Z 716 and the node R 722 is higher than weight of the other connections between the node R 722 and output of the original model 710.

Figure 10:
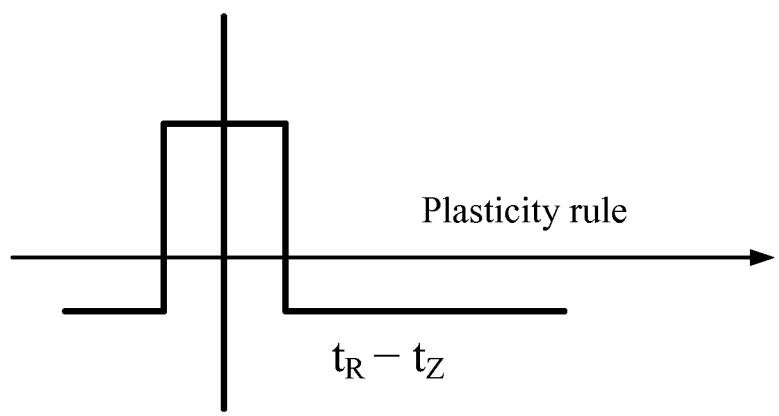
FIG. 10 illustrates an example plasticity rule, in accordance with certain aspects of the present disclosure.

FIG. 10 illustrates an example plasticity rule that may be used in the proposed tagging method, in accordance with certain aspects of the present disclosure. As illustrated in the figure, weight of a plastic connection between two nodes may be modified based on the time that each of the nodes show a spike.

It should be noted that the proposed technique is not specific to sensory stimulus classification, and can be applied for tagging classes of input/outputs of any neural network block. For example, the proposed method can be applied to create tags for actions coming out of a neural network block sending motor control commands to a motor, as illustrated in FIG. 11.

Figure 11:
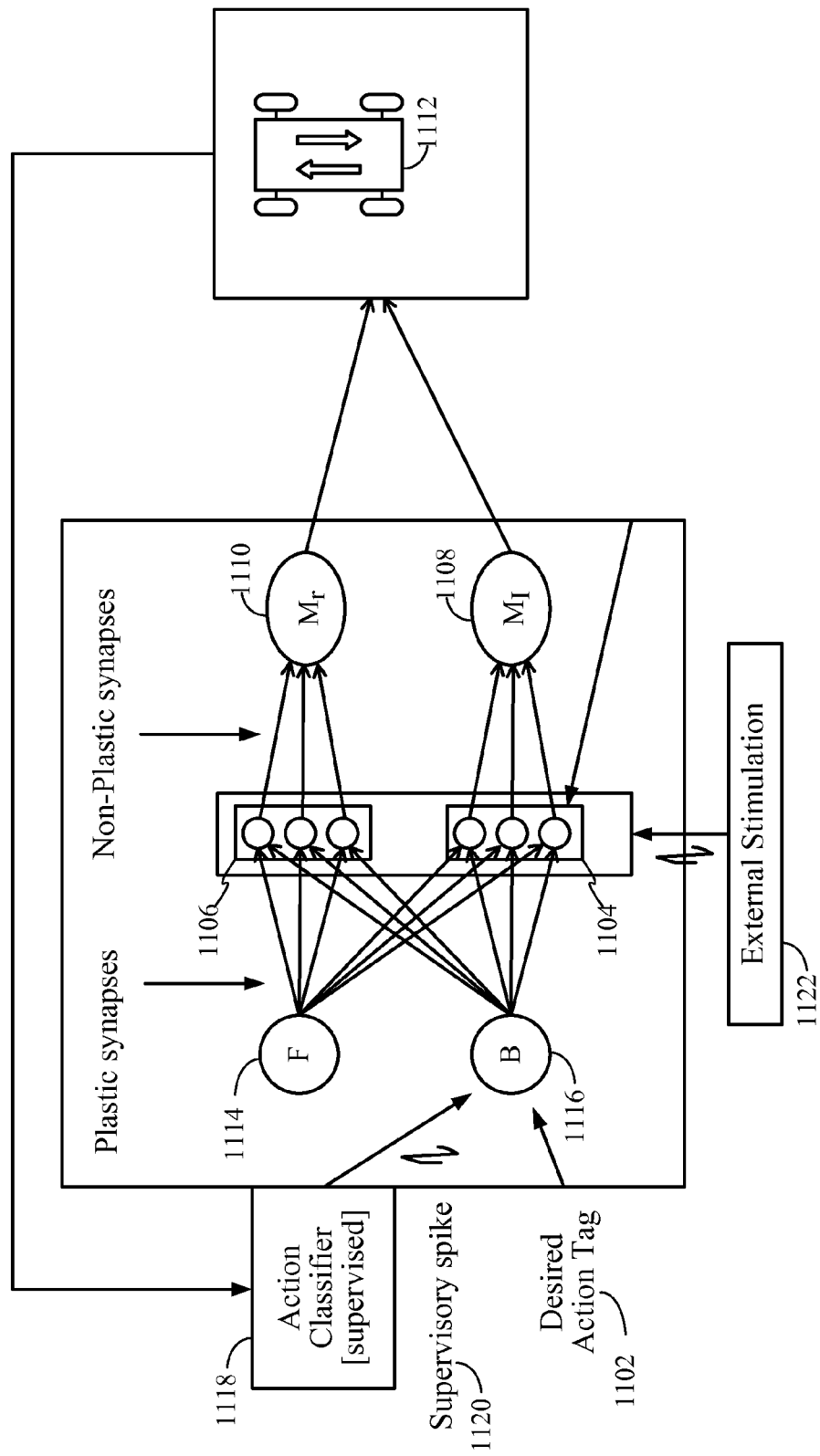
FIG. 11 illustrates an example application of the proposed method in creating input action tags for a motor, in accordance with certain aspects of the present disclosure.

FIG. 11 illustrates an example application of the proposed method in creating input action tags for a motor, in accordance with certain aspects of the present disclosure. As illustrated, a device (e.g., a robot 1112) may be connected to motor neurons $M_l$ 1108 and $M_r$ 1110 that modulate motor activity. The motor neurons $M_l$ 1108 and $M_r$ 1110 may be connected to arrays of externally stimulated neurons 1104 and 1106, respectively. Each of the motors may be connected to all of the neurons of one of the arrays through non-plastic connections. For example, the motor $M_l$ 1108 may be connected to all of the neurons of the array 1104. Each of the arrays of neurons 1104 and/or 1106 may cause different movements in the robot.

Next, action tags (e.g., forward (F) 1114 and/or backward (B) 1116) may be connected to all of the neurons in each of the arrays 1104 and 1106 through plastic synapses. In order to determine action tags for the movements in the device, a supervised action classifier 1118 may send a supervisory spike to one of the action tags (e.g., B 1116). An external stimulation signal 1122 may also be sent to the arrays of neurons at a proper time. Based on the direction of movement of the device in response to the stimulation and the supervisory signal, input action tags may be created for forward and/or backwards movement of the device. In some cases, the timing of when certain tags are created may depend on the particular movements of the device. For example, if a device (e.g., a robot) moves backwards or forwards with high accuracy, the action tag neuron may be stimulated immediately. On the other hand, if the device moves with less accuracy, the action tag neuron may be stimulated with some delay. This timing effect, along with plasticity rules may allow for graded learning.

Figure 12:
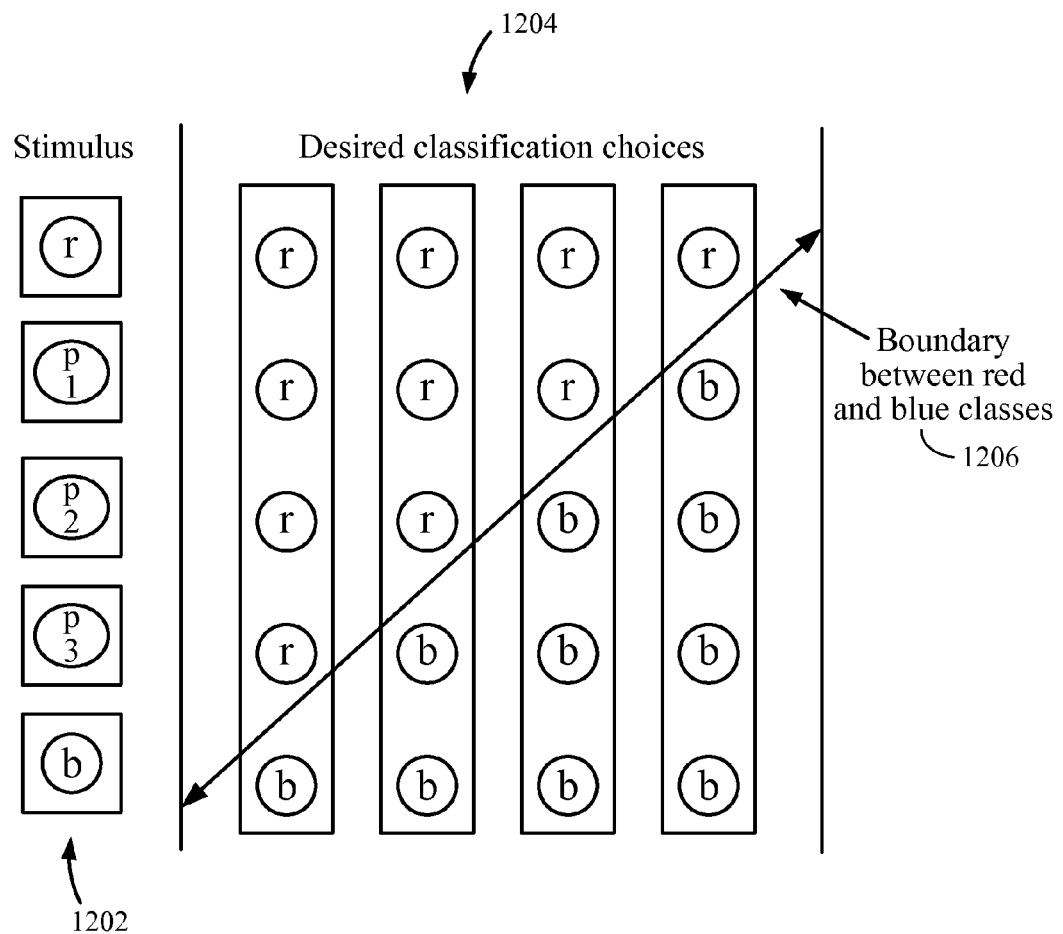
FIG. 12 illustrates an example application of the proposed tagging method in creating class boundaries, in accordance with certain aspects of the present disclosure.

For certain aspects, the proposed tagging method may be used to create boundaries between classes of nodes. FIG. 12 illustrates an example application of the proposed tagging method in creating class boundaries, in accordance with certain aspects of the present disclosure. As illustrated, a neural network model may have two desired outputs (e.g., blue and/or red). In this example, a purple stimulus 1202 (which is a combination of blue and red colors) may be classified as either red or blue (e.g., depending on the shade of purple, having more blue and/or more red pigments). For example, P1 may include more red color than blue, P2 may include equal amounts of red and blue color, and P3 may include more blue than red color. Desired classification choices are shown in columns 1204. The red and blue class boundaries 1206 may be controlled using the proposed tagging method.

Figure 13A:
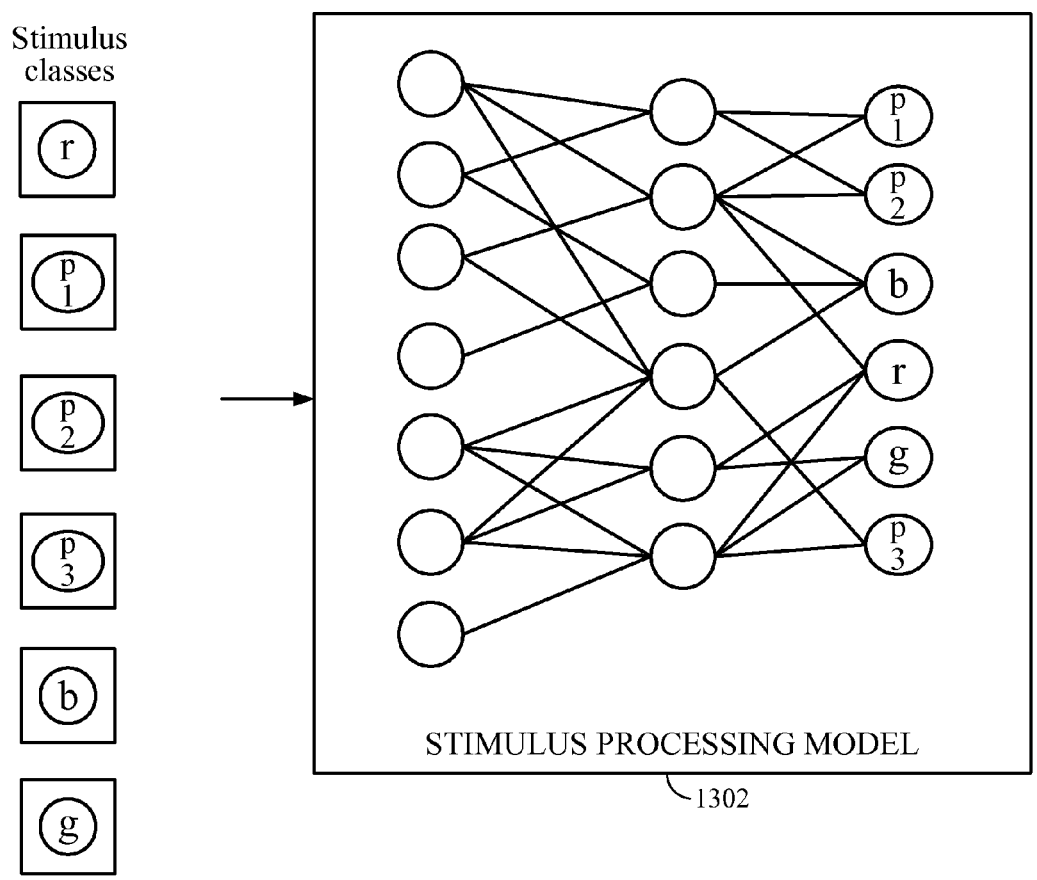
FIGS. 13A-13C illustrate another example application of the proposed tagging method to coalesce classes, in accordance with certain aspects of the present disclosure.
Figure 13B:
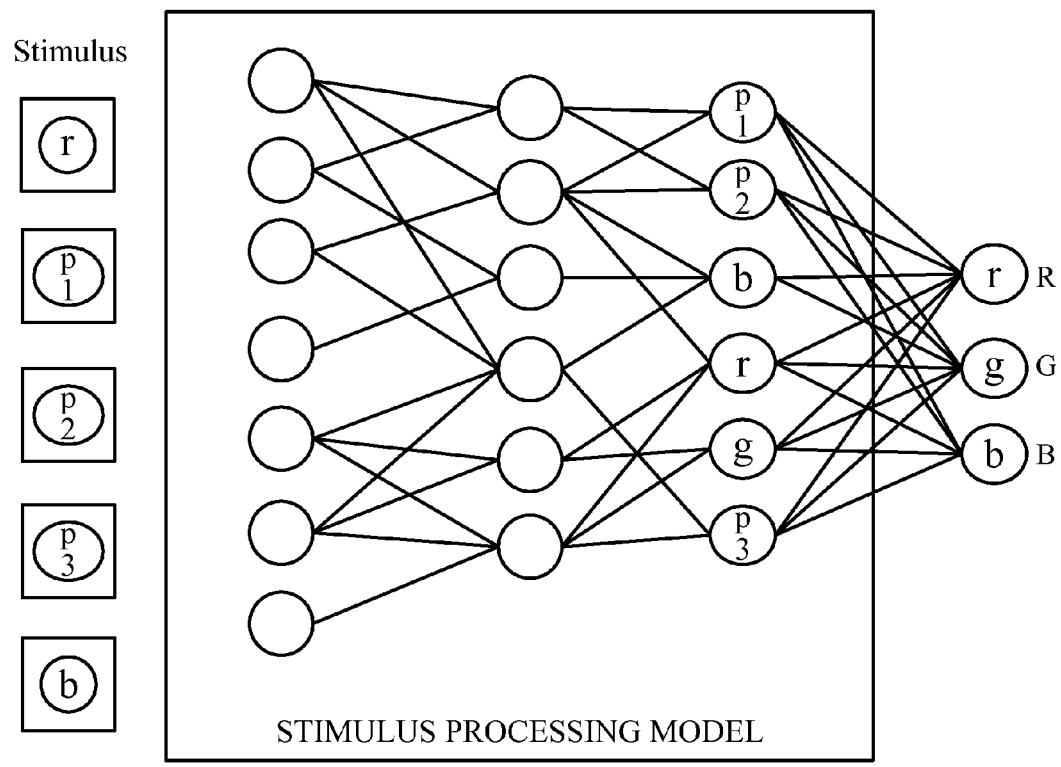
Figure 13C:
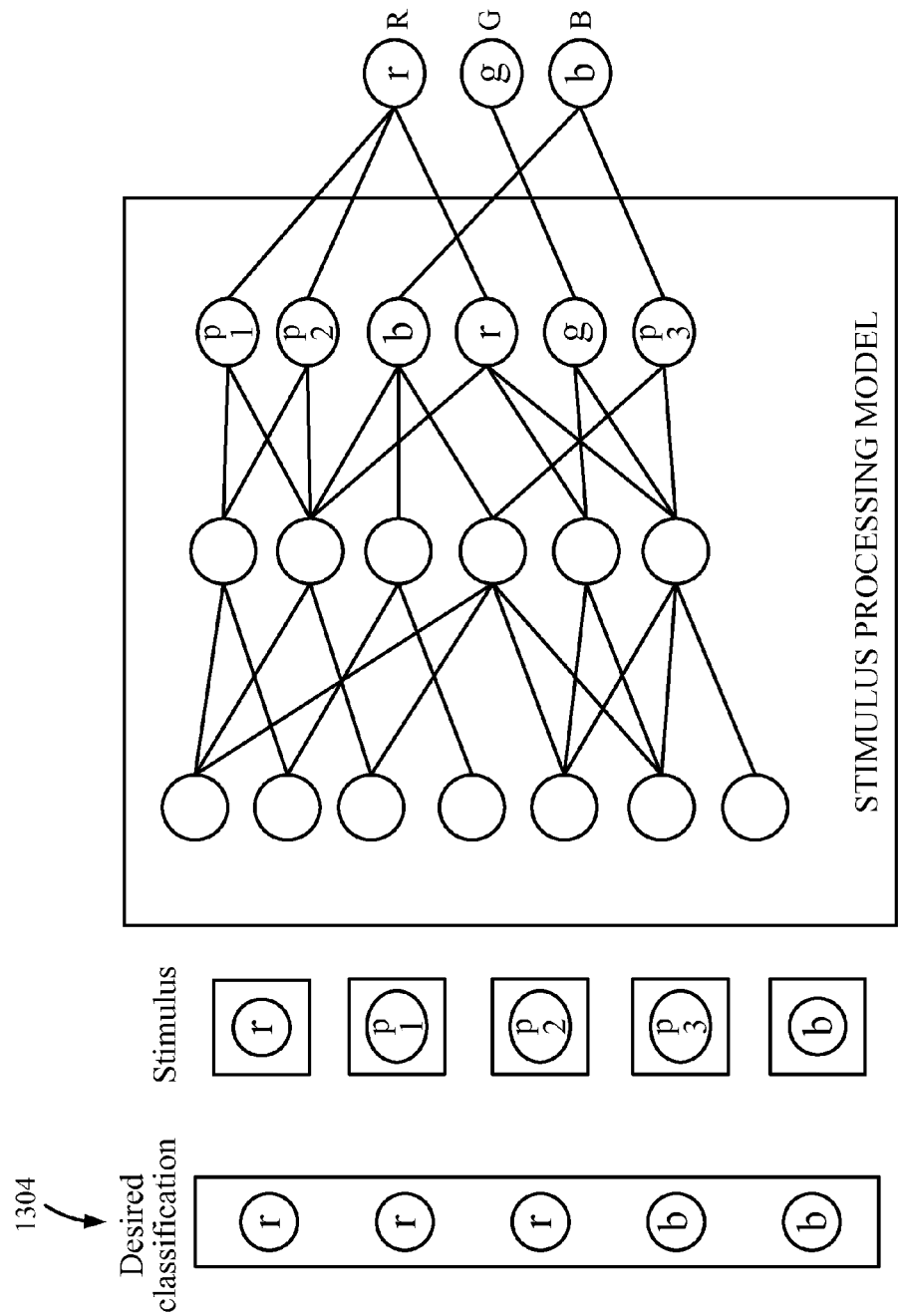

FIGS. 13A-13C illustrate another example application for the proposed tagging method (e.g., to coalesce classes), in accordance with certain aspects of the present disclosure. FIG. 13A illustrates a stimulus processing model 1302 that may be trained to create a plurality of classes (e.g., six classes including red, blue, green and three purple classes P1, P2, and P3). The proposed tagging method may be used to reduce number of output classes. For example, the proposed tagging method may be used to reduce the output classes in FIG. 13A to three classes red, green and blue. First, the network may be augmented as illustrated in FIG. 13B. All of the neurons in the output layer of the stimulus processing model may be connected to all of the neurons in the augmented model through plastic synapses. Next, the network may be trained to create the desired boundaries 1304, as illustrated in FIG. 13C. It should be noted that the augmented network may be trained simultaneously with the stimulus processing model 1302 (e.g., the unsupervised network).

Figure 14A:
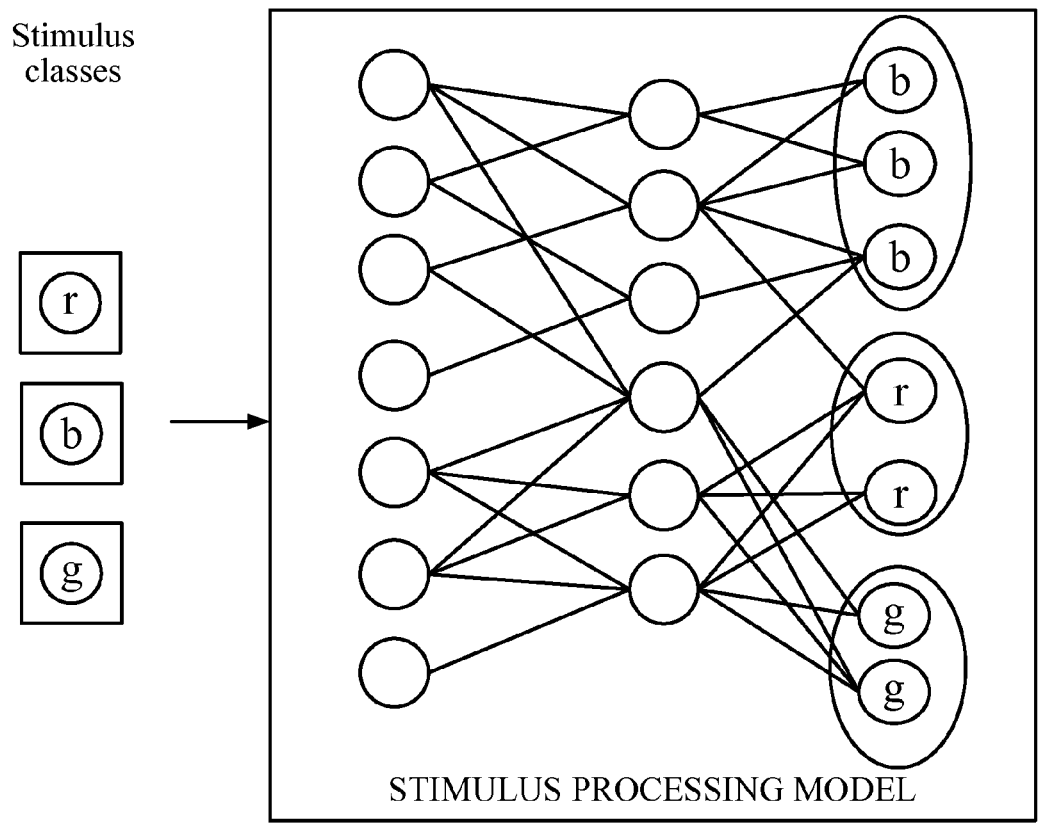
FIGS. 14A-14C illustrate an example application of the proposed tagging method in a neural network with overcomplete representation, in accordance with certain aspects of the present disclosure.
Figure 14B:
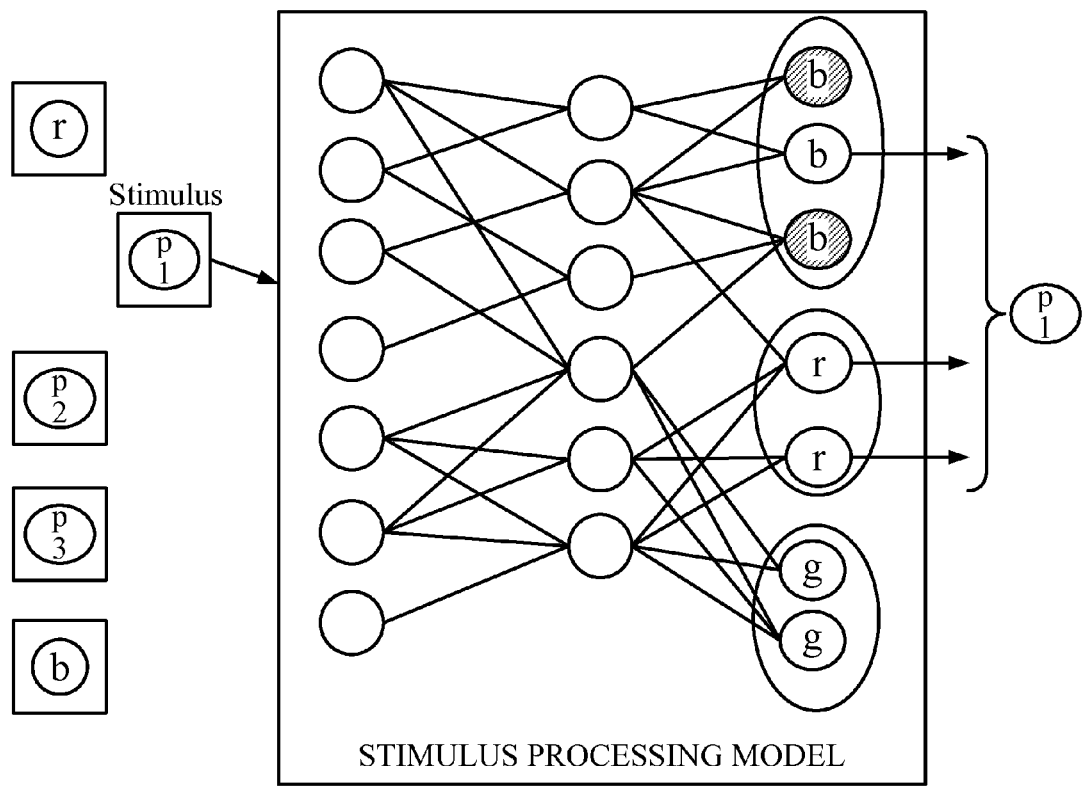
Figure 14C:
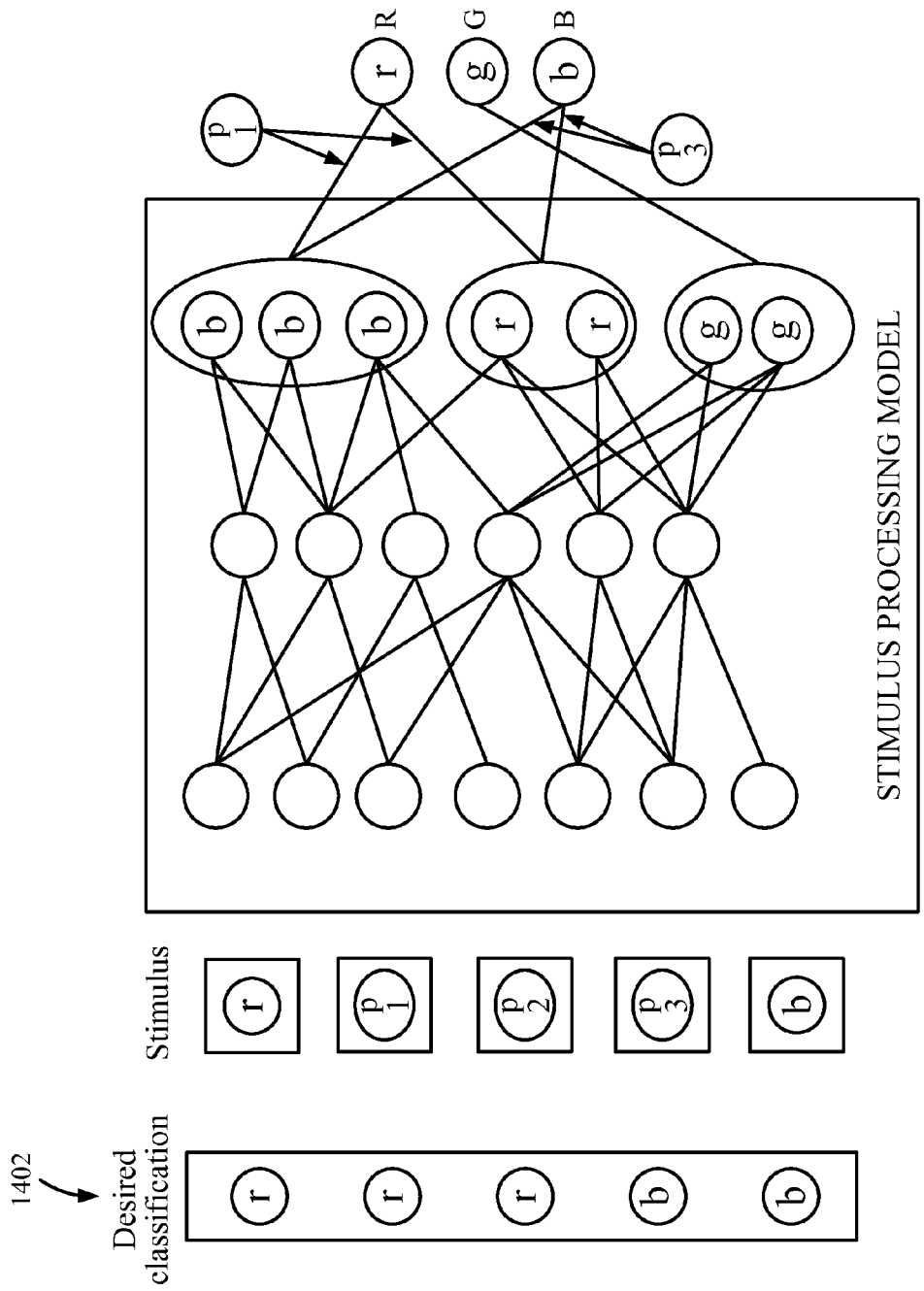

FIGS. 14A-14C illustrate another example application of the proposed tagging method in a neural network with over-complete representation, in accordance with certain aspects of the present disclosure. As illustrated in FIG. 14A, a neural network model may be trained to create a plurality of desired classes (e.g., three different classes, such as red, blue and green). Each of the classes may be represented with a population of neurons in the output layer, as illustrated in FIG. 14A. For example, three neurons may be represented by blue, two neurons may be represented by red and two neurons may be represented by green. FIG. 14B illustrates how the over-complete representation may allow subset of populations to encode distance to class mean. For example, the purple stimulus P1 may be represented across subset of blue and red neuron populations (e.g., two red neurons and one blue neuron).

As illustrated in FIG. 14C, over-complete representation may allow each of the purple stimuli (e.g., p1, p2, p3) to be represented by a mix of neurons from blue and red populations. The augmented network may be trained to create the desired classification 1402.

Figure 15:
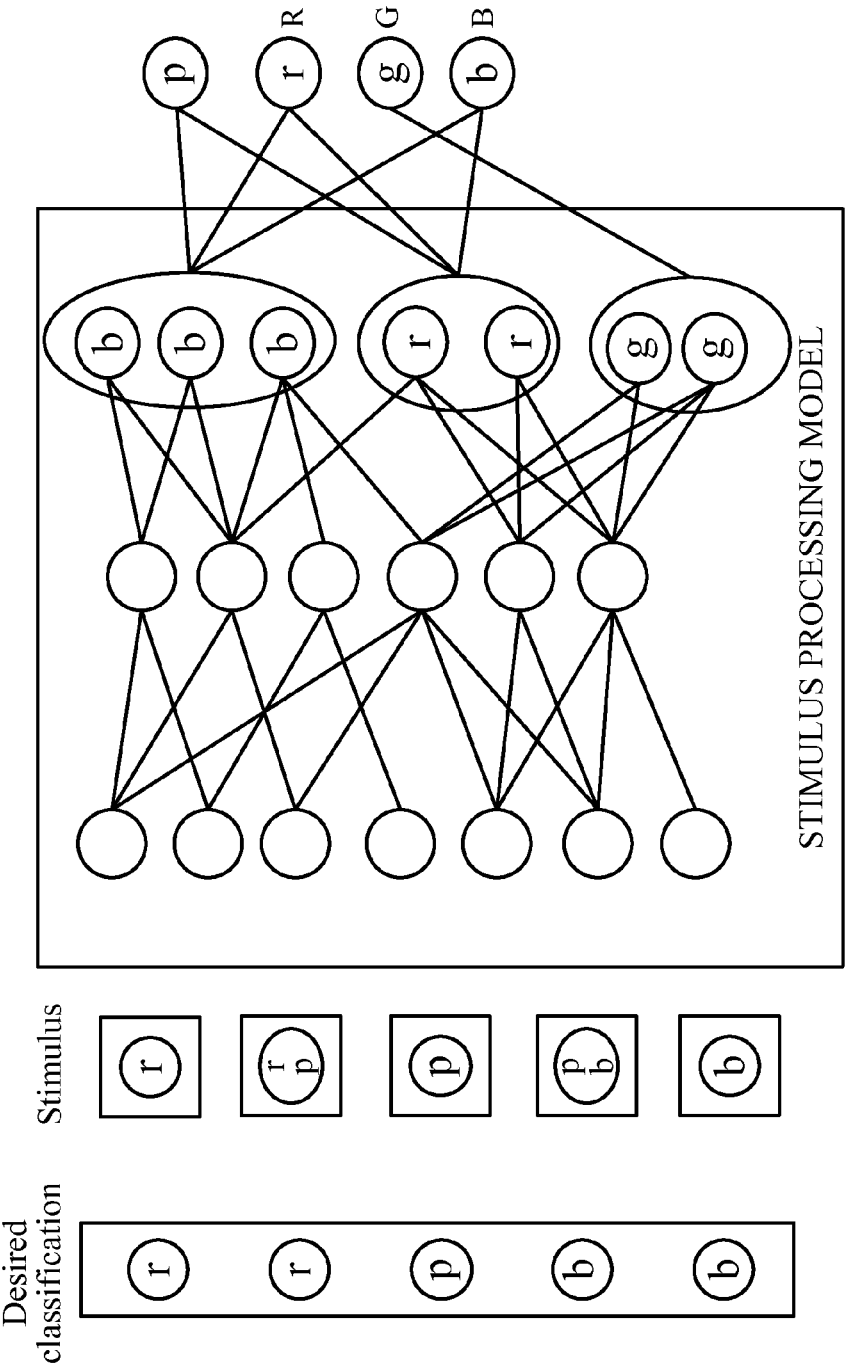
FIG. 15 illustrates an example method for adding a new class to a neural network, in accordance with certain aspects of the present disclosure.

Certain aspects of the present disclosure may use the proposed tagging method to add a new class to output classes of a neural network model. As an example, a new class may be added to a neural network model as illustrated in FIG. 15. In this example, the initial classification includes three output classes (e.g., red, green and blue). A new class may be added to the outputs by defining an additional output neuron and training the augmented network.

One alternative to the proposed tagging method is to train the neural block implementing the unsupervised learning algorithm and then to manually associate outputs of the model to downstream blocks. This approach can quickly become cumbersome. It can be automated, for example, by testing output of the model for a specific stimulus (e.g., red ball) and evaluating the firing in the output layer of the model. However, this approach may not be simple if multiple neurons in the output layer represent the stimulus (e.g., if population encoding is used). The function of evaluating the output neurons and mapping these to stimulus classes may itself become complex. In comparison, the proposed method uses supervised training to create the mapping function. Thus, the proposed tagging method is robust to population encoding.

It should be noted that the methods presented herein may also be used to create tags for a specific temporal pattern in a network. For example, in a debugger, an invalid state (e.g., which may have a specific temporal pattern) may be tagged using the proposed method. In general, the proposed tagging method may be used to identify a specific network pattern using STDP. It should be noted that, in general, the augmented network 720, as illustrated in FIG. 7, may be connected to output layer, input layer and/or any intermediate layer of the stimulus processing network 710. The combination of the two networks may then be supervisory trained to create the desired tags.

For certain aspects, there may be a one-to-many relationship between the neural network model 710 and the tags created by the augmented network 720. For example, a tag may be created as a "car", and a more generic tag may be created (e.g., a vehicle) and/or a more specific tag may be created (e.g., Honda).

Example Alternative Solution

Figure 16:
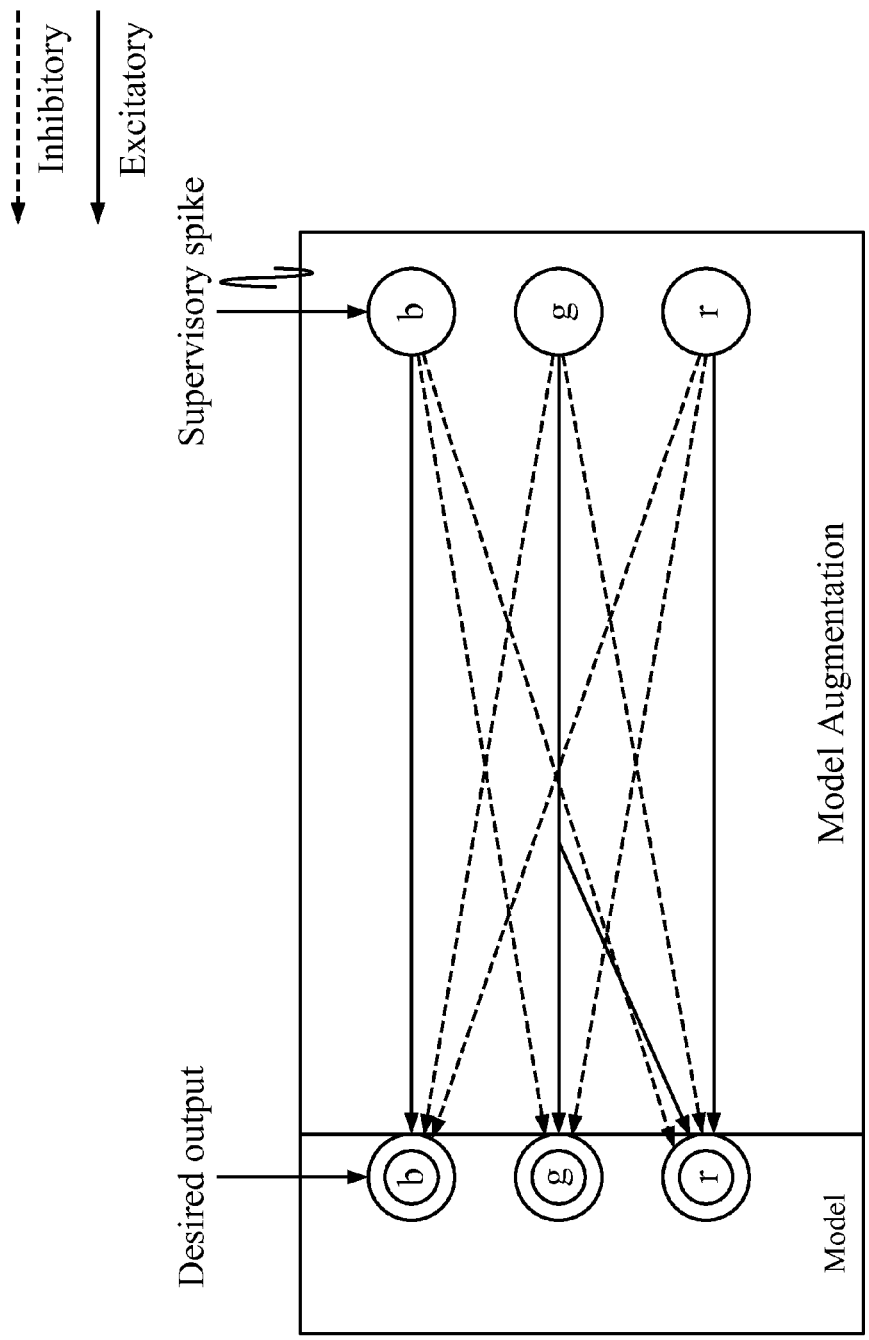
FIG. 16 illustrates an example model utilizing supervisory signals, in accordance with certain aspects of the present disclosure.

According to certain aspects, the model discussed above may be augmented by sending supervisory spikes directly to an output layer, as illustrated in FIG. 16. In this example, application of supervisory spikes may enable a static mapping between a stimulus class and output neuron representing that stimulus class. According to certain aspects, a set of neurons carrying a supervisory signal (inhibitory or excitatory) may be connected to the output layer. As illustrated in FIG. 16, supervisory synapses may be connected to all output layer neurons. The output layer neuron that is desired to map to a certain label is connected with a positive weight synapse (excitatory), while other output layer neurons may be connected with a negative weight synapse (inhibitory).

Figure 17:
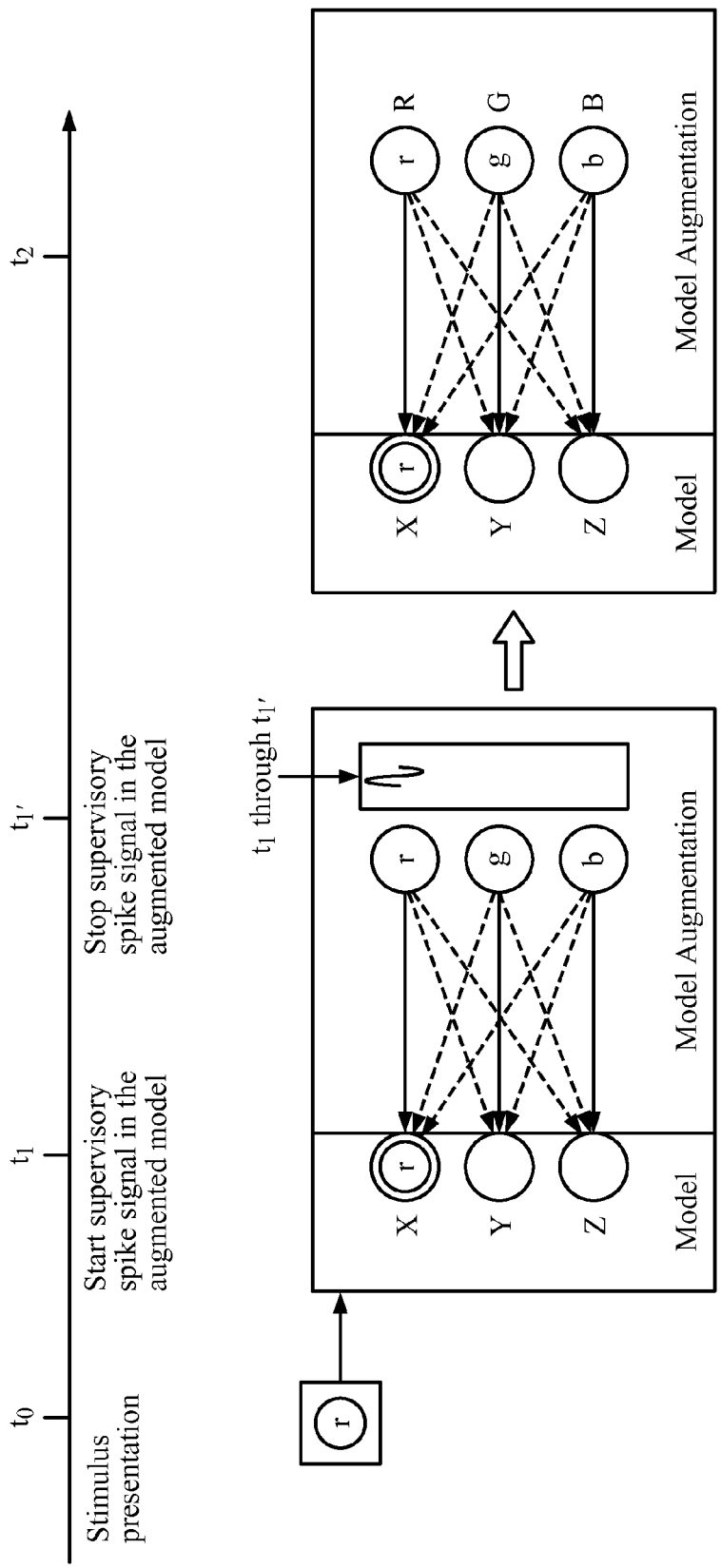
FIG. 17 illustrates example timing of application of supervisory signals, in accordance with certain aspects of the present disclosure.

FIG. 17 illustrates example timing of application of supervisory signals, in accordance with certain aspects of the present disclosure. As illustrated, once the stimulus is presented (at t0) a supervisory signal is sent into the network (at t1). The supervisory neuron generates a positive supervisory signal and (optionally) negative supervisory signals on the output layer neurons (and is applied until t1'). This supervisory input by itself does not cause a spike in the output layer neuron, but creates a positive bias for the firing on the desired output layer neuron (at time t2), while optionally creating a negative bias for the firing of other neurons. The amount of positive and/or negative bias can be controlled through synaptic weights.

Figure 18:
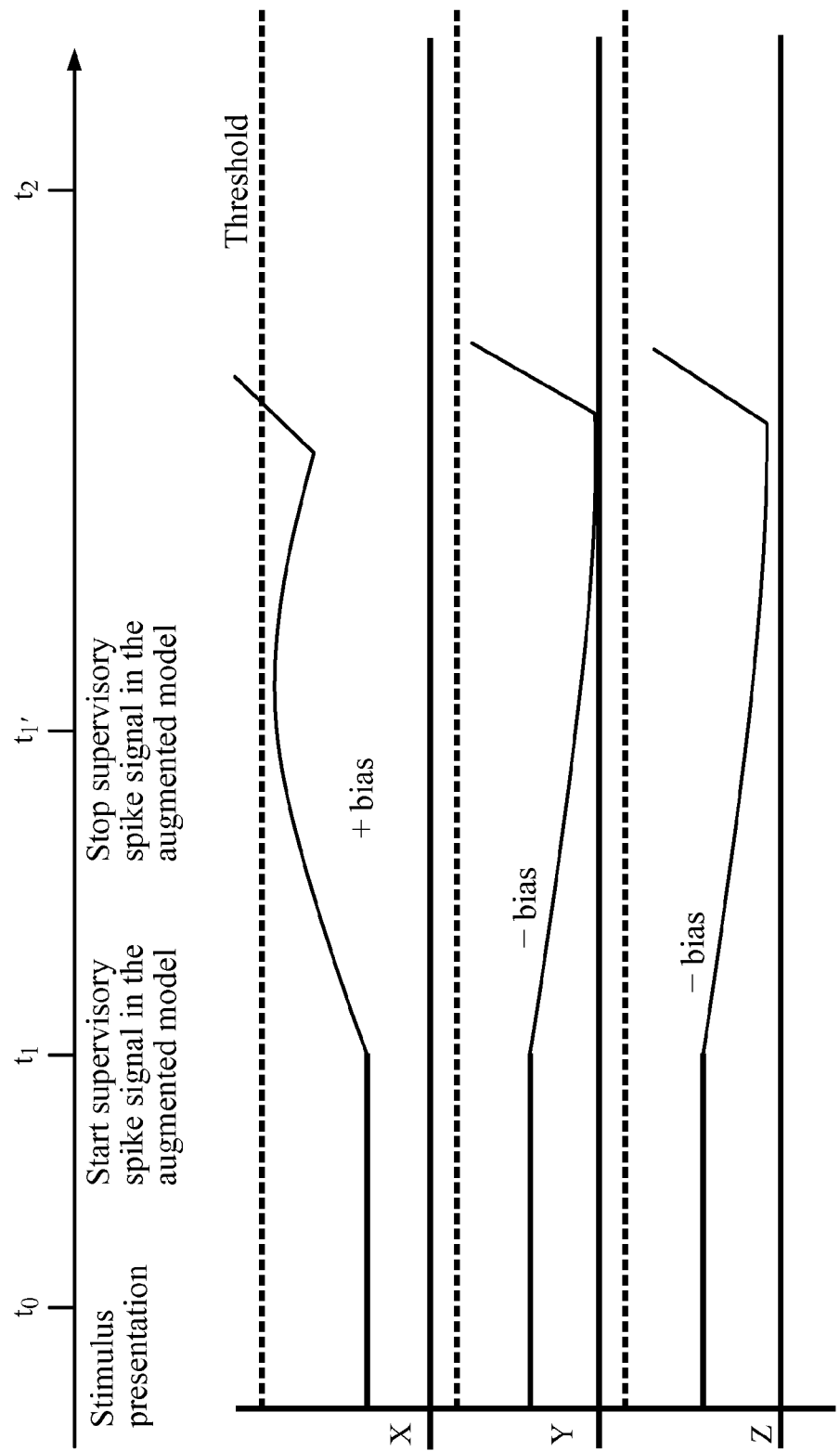
FIG. 18 illustrates example effect of application of supervisory signals, in accordance with certain aspects of the present disclosure.

The effect of this supervisory is illustrated in FIG. 18. As illustrated, the positive bias can bring a desired output layer neuron (neuron X in the illustrated example) closer to a firing threshold. Similarly, optional negative bias can bring the other output layer neurons (Y and Z) further below the threshold. While this supervisory "sub-threshold" bias does not cause a spike itself, upon receiving network input, it may help overcome the effect of randomness in class-to-output layer neuron mapping and help ensure that only neuron X crosses the firing threshold upon receiving network input, while keeping Y and Z below the firing threshold.

Figure 20A:
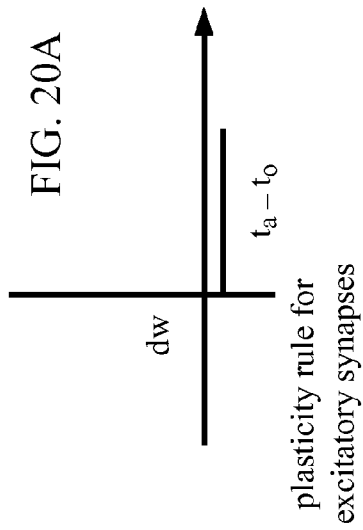
FIGS. 19, 20A and 20B illustrate example rules for adjusting supervisory signals, in accordance with certain aspects of the present disclosure.
Figure 20B:
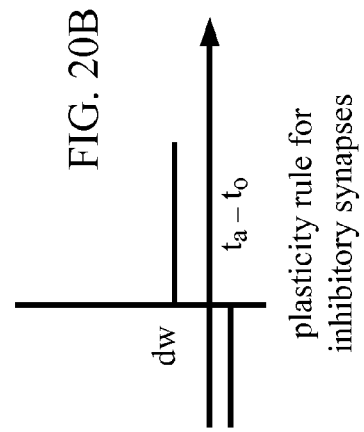
Figure 19:
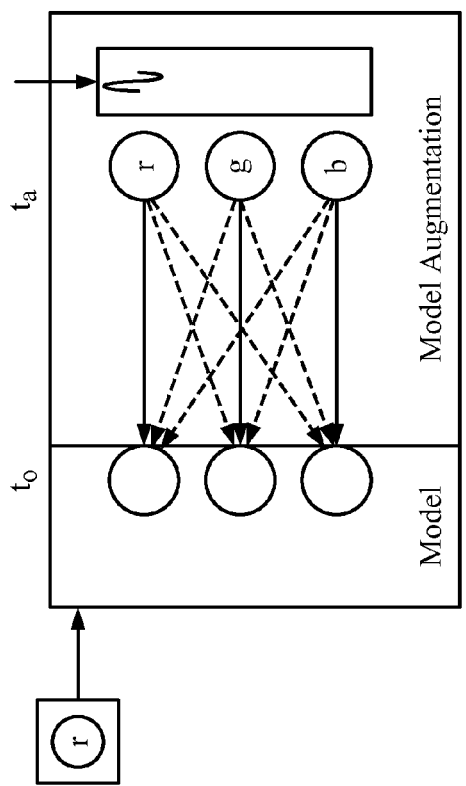

As illustrated in FIGS. 19 and 20, STDP rules described above may also be applied to adjust weights of supervisory synapses. As shown in FIG. 20A, positive supervisory bias may be reduced when correct output is observed. On the other hand, negative supervisory may be increased for incorrect output or decreased otherwise, as shown in FIG. 20B. As discussed above, the STDP rules may allow for turning off supervision once the network learns. In some cases, the duration for applying supervisory input (e.g., t1 through t1' shown in FIG. 18) may be adjusted based on network performance.

Figure 21:
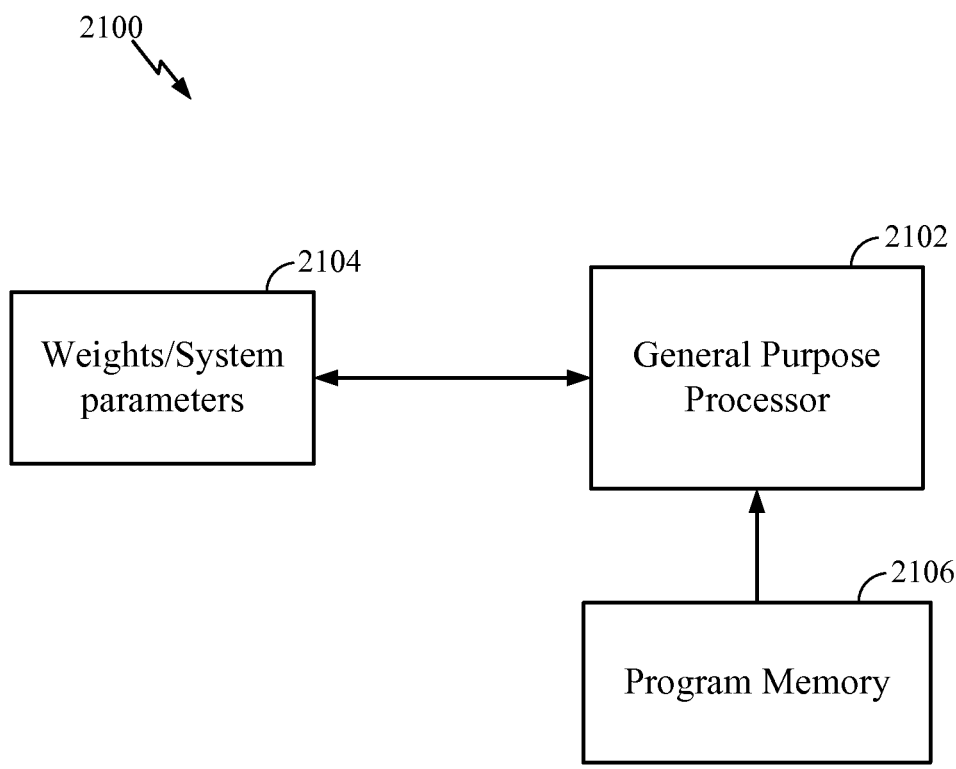
FIG. 21 illustrates an example implementation of designing a neural network using a general-purpose processor in accordance with certain aspects of the present disclosure.

FIG. 21 illustrates an example implementation 2100 of the aforementioned method for tagging classes in a neural system using a general-purpose processor 2102 in accordance with certain aspects of the present disclosure. Variables (neural signals), synaptic weights and system parameters associated with a computational network (neural network) may be stored in a memory block 2104, while instructions related executed at the general-purpose processor 2102 may be loaded from a program memory 2106. In an aspect of the present disclosure, the instructions loaded into the general-purpose processor 2102 may comprise code for identifying a first network comprising one or more indexed classes of nodes; and determining one or more tags for the one or more classes of nodes regardless of their indexing.

Figure 22:
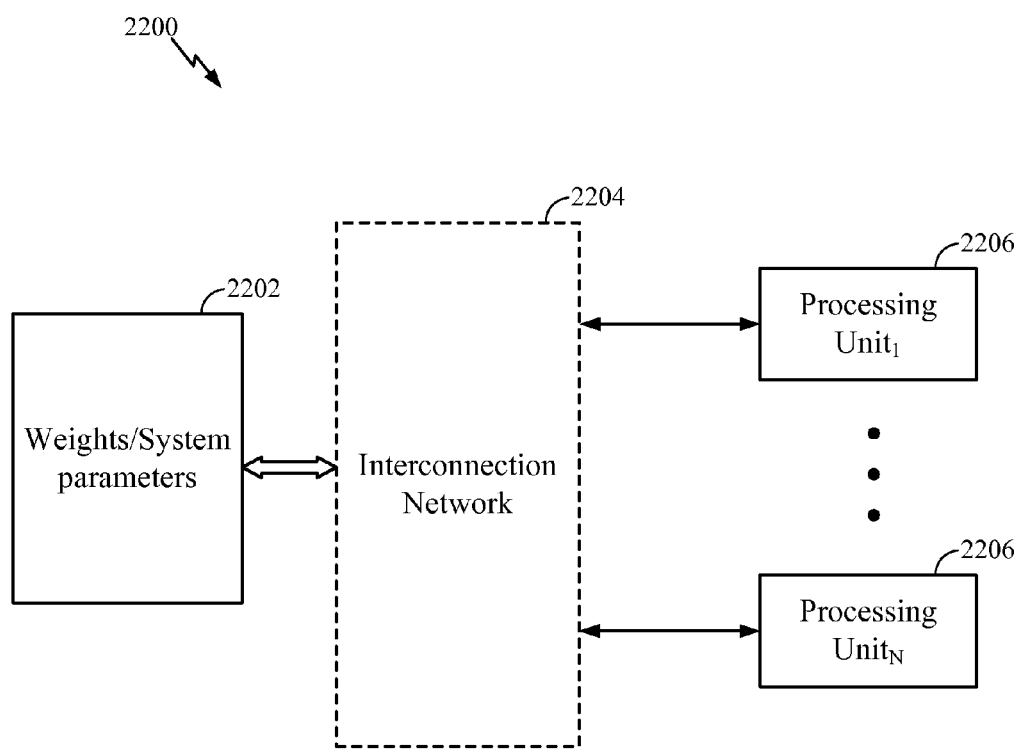
FIG. 22 illustrates an example implementation of designing a neural network where a memory may be interfaced with individual distributed processing units in accordance with certain aspects of the present disclosure.

FIG. 22 illustrates an example implementation 2200 of the aforementioned method for tagging classes in a neural system where a memory 2202 can be interfaced via an interconnection network 2204 with individual (distributed) processing units (neural processors) 2206 of a computational network (neural network) in accordance with certain aspects of the present disclosure. Variables (neural signals), synaptic weights and system parameters associated with the computational network (neural network) may be stored in the memory 2202, and may be loaded from the memory 2202 via connection(s) of the interconnection network 2204 into each processing unit (neural processor) 2206. In an aspect of the present disclosure, the processing unit 2206 may be configured to identify a first network comprising one or more indexed classes of nodes and determine one or more tags for the one or more classes of nodes regardless of their indexing.

Figure 23:
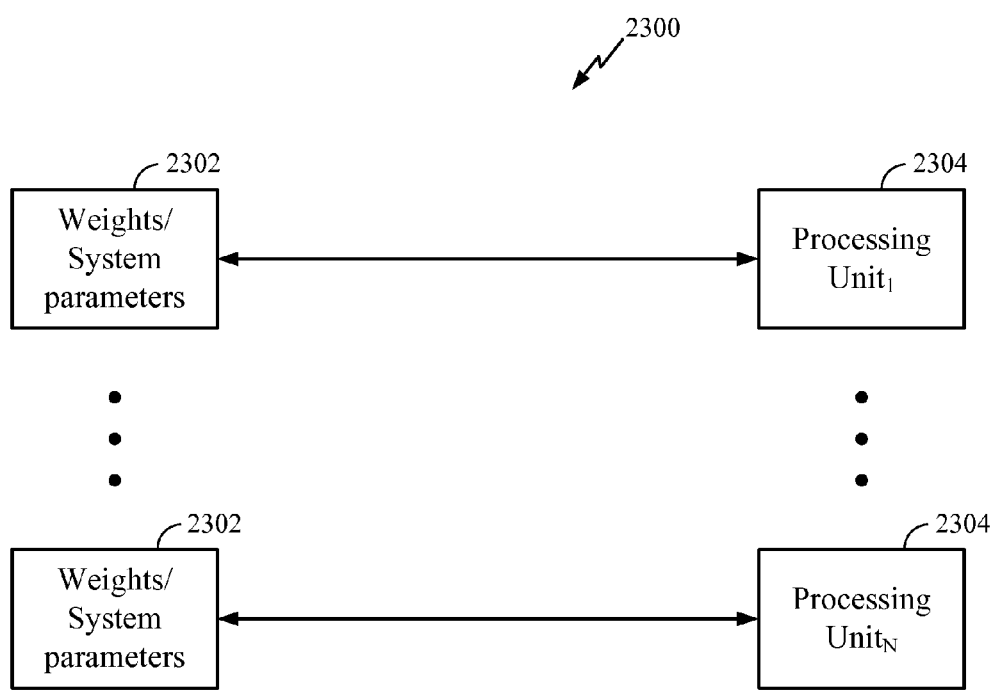
FIG. 23 illustrates an example implementation of designing a neural network based on distributed memories and distributed processing units in accordance with certain aspects of the present disclosure.

FIG. 23 illustrates an example implementation 2300 of the aforementioned method for tagging classes in a neural system based on distributed weight memories 2302 and distributed processing units (neural processors) 2304 in accordance with certain aspects of the present disclosure. As illustrated in FIG. 23, one memory bank 2302 may be directly interfaced with one processing unit 2304 of a computational network (neural network), wherein that memory bank 2302 may store variables (neural signals), synaptic weights and system parameters associated with that processing unit (neural processor) 2304. In an aspect of the present disclosure, the processing unit 2304 may be configured to identify a first network comprising one or more indexed classes of nodes, and determine one or more tags for the one or more classes of nodes regardless of their indexing.

Figure 24:
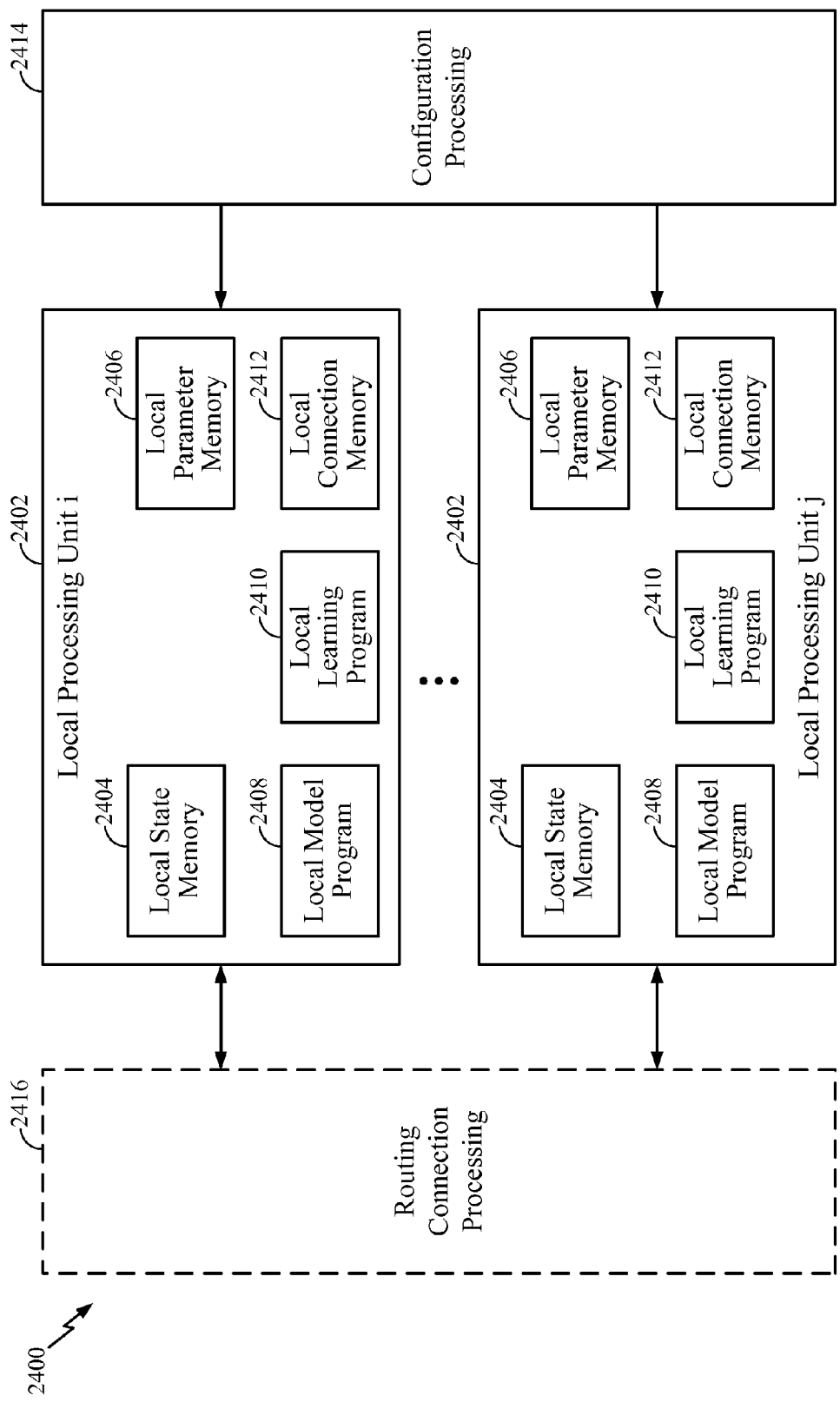
FIG. 24 illustrates an example implementation of a neural network in accordance with certain aspects of the present disclosure.

FIG. 24 illustrates an example implementation of a neural network 2400 in accordance with certain aspects of the present disclosure. As illustrated in FIG. 24, the neural network 2400 may comprise a plurality of local processing units 2402 that may perform various operations of methods described above. Each processing unit 2402 may comprise a local state memory 2404 and a local parameter memory 2406 that store parameters of the neural network. In addition, the processing unit 2402 may comprise a memory 2408 with local (neuron) model program, a memory 2410 with local learning program, and a local connection memory 2412. Furthermore, as illustrated in FIG. 24, each local processing unit 2402 may be interfaced with a unit 2414 for configuration processing that may provide configuration for local memories of the local processing unit, and with routing connection processing elements 2416 that provide routing between the local processing units 2402.

According to certain aspects of the present disclosure, the operations 800 illustrated in FIG. 8 may be performed in hardware, e.g., by one or more processing units 2402 from FIG. 24.

Figure 8A:
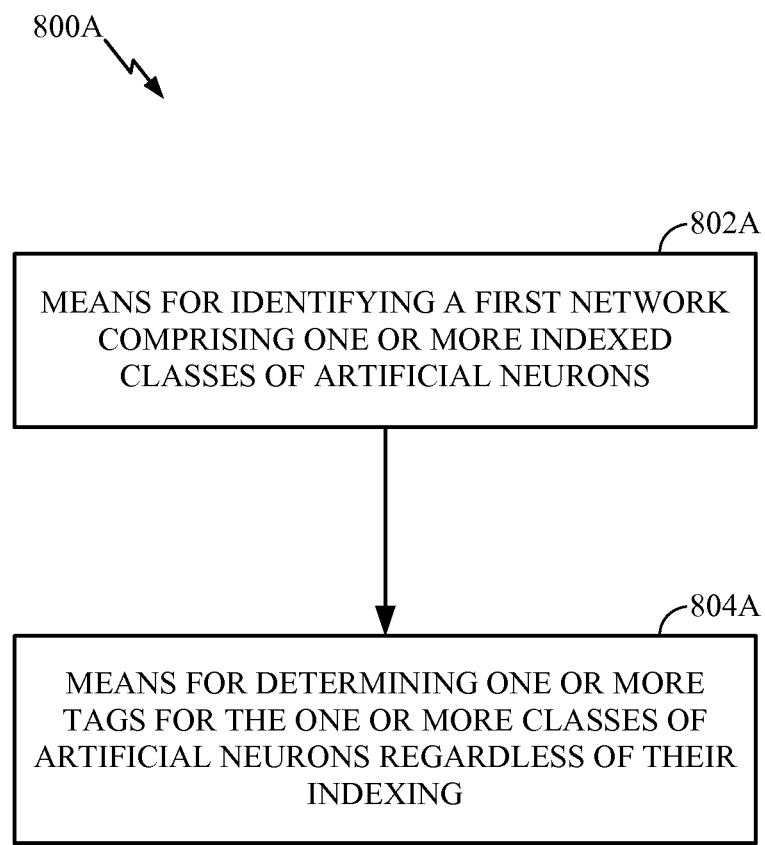
FIG. 8A illustrates example components capable of performing the operations illustrated in FIG. 8.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may have corresponding counterpart means-plus-function components with similar numbering. For example, operations 800 illustrated in FIG. 8 correspond to components 800A illustrated in FIG. 8A.

As an example, means for identifying, means for determining, means for augmenting, means for connecting and/or means for training may be a processing element, such as a general purpose processor or a special purpose processor such as a digital signal processor (DSP), ASIC or the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration. For example, means for identifying, means for determining, means for inferring and means for updating may be any suitable processing element such as a processor or the like.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method, comprising:
   identifying a first network comprising one or more indexed classes of artificial neurons; and
   determining one or more tags for the one or more indexed classes of artificial neurons regardless of their indexing, wherein determining the one or more tags for the one or more indexed classes of artificial neurons comprises:
   augmenting the first network with a second network comprising one or more artificial neurons, wherein each neuron in the second network corresponds to a tag;
   connecting each of the one or more indexed classes of artificial neurons to all the neurons in the second network with one or more plastic connections; and
   providing supervisory bias signals to the one or more indexed classes of artificial neurons via the plastic connections, such that the supervisory signal imposes a desired mapping between classes and output layer neurons.

2. The method of claim 1, wherein determining the one or more indexed classes of artificial neurons comprises using an unsupervised learning algorithm.

3. The method of claim 1, wherein one of the indexed classes comprises a specific temporal pattern.

4. The method of claim 1, wherein each of the indexed classes of artificial neurons correspond to one or more tags.

5. The method of claim 1, further comprising using the one or more tags to connect the first network to an apparatus.

6. The method of claim 1, further comprising using the one or more tags to determine boundaries between different classes of artificial neurons.

7. The method of claim 1, further comprising using the one or more tags to coalesce one or more of the indexed classes of artificial neurons.

8. The method of claim 1, wherein providing supervisory bias signals comprises:
   providing positive supervisory signals below a firing threshold to create a bias for firing on a desired output layer neuron.

9. The method of claim 8, wherein providing supervisory bias signals further comprises:
   providing negative supervisory signals to create a bias for preventing firing on an non-desired output layer neuron.

10. The method of claim 1, further comprising adjusting weights of the supervisory signals such that a level of supervisory bias is adjusted according to a difference between desired and actual network output at the output layer neurons.

11. An apparatus, comprising:
    means for identifying a first network comprising one or more indexed classes of artificial neurons; and
    means for determining one or more tags for the one or more indexed classes of artificial neurons regardless of their indexing, wherein the means for determining are configured to determine the one or more tags for the one or more indexed classes of artificial neurons by:
    augmenting the first network with a second network comprising one or more artificial neurons, wherein each neuron in the second network corresponds to a tag;
    connecting each of the one or more indexed classes of artificial neurons to all the neurons in the second network with one or more plastic connections; and
    providing supervisory bias signals to the one or more indexed classes of artificial neurons via the plastic connections, such that the supervisory signal imposes a desired mapping between classes and output layer neurons.

12. An apparatus, comprising:
    at least one processor configured to identify a first network comprising one or more indexed classes of artificial neurons and determine one or more tags for the one or more indexed classes of artificial neurons regardless of their indexing, wherein the at least one processor is configured to determine the one or more tags for the one or more indexed classes of artificial neurons by:
    augmenting the first network with a second network comprising one or more artificial neurons, wherein each neuron in the second network corresponds to a tag;
    connecting each of the one or more indexed classes of artificial neurons to all the neurons in the second network with one or more plastic connections; and
    providing supervisory bias signals to the one or more indexed classes of artificial neurons via the plastic connections, such that the supervisory signal imposes a desired mapping between classes and output layer neurons; and
    a memory coupled with the at least one processor.

13. A non-transitory computer readable medium having instructions stored thereon for:
    identifying a first network comprising one or more indexed classes of artificial neurons; and
    determining one or more tags for the one or more indexed classes of artificial neurons regardless of their indexing, wherein the instructions for determining the one or more tags for the one or more indexed classes of artificial neurons comprise instructions for determining the one or more tags for the one or more indexed classes of artificial neurons by:

augmenting the first network with a second network comprising one or more artificial neurons, wherein each neuron in the second network corresponds to a tag;

connecting each of the one or more indexed classes of artificial neurons to all the neurons in the second network with one or more plastic connections; and providing supervisory bias signals to the one or more indexed classes of artificial neurons via the plastic connections, such that the supervisory signal imposes a desired mapping between classes and output layer neurons.

14. The apparatus of claim 12, wherein the at least one processor is configured to determine the one or more indexed classes of artificial neurons using an unsupervised learning algorithm.

15. The apparatus of claim 12, wherein one of the indexed classes comprises a specific temporal pattern.

16. The apparatus of claim 12, wherein each of the indexed classes of artificial neurons correspond to one or more tags.

17. The method of claim 12, wherein the at least one processor is configured to use the one or more tags to connect the first network to an apparatus.

18. The apparatus of claim 12, wherein at least one processor is configured to use the one or more tags to determine boundaries between different classes of artificial neurons.

19. The apparatus of claim 12, wherein at least one processor is configured to use the one or more tags to coalesce one or more of the indexed classes of artificial neurons.

20. The apparatus of claim 12, wherein the at least one processor configured to provide supervisory bias signals is configured to:

provide positive supervisory signals below a firing threshold to create a bias for firing on a desired output layer neuron.

21. The apparatus of claim 20, wherein the at least one processor configured to provide supervisory bias signals is further configured to:

provide negative supervisory signals to create a bias for preventing firing on an non-desired output layer neuron.

22. The apparatus of claim 12, wherein the at least one processor is further configured to adjust weights of the supervisory signals such that a level of supervisory bias is adjusted according to a difference between desired and actual network output at the output layer neurons.

* * * * *